(12) United States Patent
James et al.

(10) Patent No.: US 7,233,482 B2
(45) Date of Patent: Jun. 19, 2007

(54) ENERGY STORAGE DEVICE

(75) Inventors: David Albert James, Mount Waverley (AU); Stephen Robert Wilson, Glen Iris (AU); Alina Kay Sloan, Port Melbourne (AU); Richard Michael Stephens, Lower Plenty (AU)

(73) Assignee: CAP-XX Limited, Dee Why, NSW (AU)

( * ) Notice: Subject to any disclaimer, the term of this patent is extended or adjusted under 35 U.S.C. 154(b) by 0 days.

(21) Appl. No.: 11/398,672

(22) Filed: Apr. 6, 2006

(65) Prior Publication Data
US 2006/0193104 A1 Aug. 31, 2006

Related U.S. Application Data

(63) Continuation of application No. 10/433,160, filed as application No. PCT/AU2001/001613 on Dec. 6, 2001, now Pat. No. 7,054,139.

(30) Foreign Application Priority Data
Dec. 6, 2000 (AU) .................................. PR1944

(51) Int. Cl.
*H01G 9/00* (2006.01)
(52) U.S. Cl. .............. 361/502; 361/504; 361/508; 361/512; 361/516; 361/519; 29/25.01; 29/25.03
(58) Field of Classification Search ........ 361/502–504, 361/508–512, 516–519; 29/25.03, 25.01
See application file for complete search history.

(56) References Cited

U.S. PATENT DOCUMENTS

| | | | |
|---|---|---|---|
| 4,540,642 A | 9/1985 | Kaun | |
| 4,594,758 A | 6/1986 | Watanabe et al. | |
| 5,450,279 A * | 9/1995 | Yoshida et al. | 361/502 |
| 5,518,836 A | 5/1996 | McCullough | 429/94 |
| 5,532,083 A * | 7/1996 | McCullough | 429/210 |
| 5,581,438 A | 12/1996 | Halliop | 361/502 |
| 5,926,361 A * | 7/1999 | Alford | 361/508 |
| 5,926,362 A | 7/1999 | Muffoletto et al. | |

(Continued)

FOREIGN PATENT DOCUMENTS

DE 2 405 158 8/1975

(Continued)

OTHER PUBLICATIONS

Derwent Abstract Accession No. 2000-331783/29, Class L03, JP 2000090965 A (Toshiba Battery Co Ltd) Mar. 31, 2000.

(Continued)

*Primary Examiner*—Nguyen T. Ha
(74) *Attorney, Agent, or Firm*—Kenyon & Kenyon LLP

(57) ABSTRACT

A surface mount energy storage device in the form of a supercapacitor (1) includes a generally rectangular folded prismatic housing (2) and two energy storage elements (not shown) that are sealingly contained within the housing (2) and which are connected in series. A mount, in the form of an integrally formed tinned metal frame (3), extends about and captively retains housing (2) in the folded configuration shown. Two terminals, in the form of elongate contacts (4, 5) extend from the energy storage elements and terminate outside housing (2) for allowing external electrical connection to the elements.

15 Claims, 30 Drawing Sheets

U.S. PATENT DOCUMENTS

| | | | |
|---|---|---|---|
| 5,963,418 A * | 10/1999 | Greenwood et al. | 361/508 |
| 6,025,095 A | 2/2000 | Kawamura | |
| 6,145,280 A | 11/2000 | Daroux et al. | |
| 6,198,623 B1 | 3/2001 | Amatucci | 361/512 |
| 6,275,372 B1 * | 8/2001 | Vassallo et al. | 361/511 |
| 6,454,816 B1 * | 9/2002 | Lee et al. | 361/502 |
| 6,627,343 B1 | 9/2003 | Kim et al. | 429/94 |
| 6,631,072 B1 * | 10/2003 | Paul et al. | 361/502 |
| 6,697,249 B2 * | 2/2004 | Maletin et al. | 361/502 |
| 6,844,111 B2 | 1/2005 | Mirzoev et al. | 429/218.2 |

FOREIGN PATENT DOCUMENTS

| | | |
|---|---|---|
| EP | 0 634 761 | 11/1997 |
| EP | 0 854 529 | 7/1998 |
| GB | 2 046 019 | 11/1980 |
| WO | WO97/49135 | 12/1997 |
| WO | 0 928 035 | 7/1999 |
| WO | WO99/36971 | 7/1999 |
| WO | WO00/16352 | 3/2000 |

OTHER PUBLICATIONS

Derwent Abstract Accession No. 98-451404/39, Class X16, JP 10188938 A (Ricoh KK) Jul. 21, 1998.
Derwent Abstract Accession No. 2001-076861/09, Class X16, JP 2000323128 A (Nitto Denko Corp) Nov. 24, 2000.
Derwent Abstract Accession No. 97/286864/26, Class A85 L03, JP 09106806 A (Nippondenso Co Ltd) Apr. 22, 1997.
Derwent Abstract Accession No. 84-298708/48, Class P55, JP 84045212 B (Matsushita Elec Ind KK) Nov. 5, 1984.
Derwent Abstract Accession No. 90-197615/26, Class V01, JP 0218097 A (Nichikon KK) May 18, 1990.
Derwent Abstract Accession No. E3984 E/16, Class X16 BE 891431 A (Maggar Holdings PTY) Mar. 31, 1982.
Derwent Abstract Accession No. 1999-333058/28, Class V01, JP 11121305 A (Okamura Kenkyusho KK) Apr. 30, 1999.

* cited by examiner

ENERGY STORAGE DEVICE

FIELD OF THE INVENTION

This is a continuation of application Ser. No. 10/433,160 filed 15 Oct. 2003 now U.S. Pat. No. 7,054,139, which is a 371 national phase application of PCT/AU2001/001613 filed 6 Dec 2001, claiming priority to Australian Application No. PR 1944 filed 6 Dec. 2000, the contents of which are incorporated herein by reference.

The present invention relates to an energy storage device.

The invention has been developed primarily for supercapacitors and will be described hereinafter with reference to that application. However, it will be appreciated that the invention is not limited to this particular field of use and is also applicable to other energy storage devices such as batteries, capacitors, fuel cells and the like.

DISCUSSION OF THE PRIOR ART

Hitherto, a variety of capacitors and supercapacitors and other energy storage devices have been devised. However, particularly for supercapacitors, the technology has not been well understood and development has been hindered through the need to use:
1. Electrolytes that are volatile, corrosive and easily contaminable;
2. Expensive and labour intensive manufacturing techniques that add significantly to the unit cost of the supercapacitors;
3. Expensive materials and handling procedures that also add significantly to the unit cost of the supercapacitors;
4. Rigid packaging;
5. Bulky packaging; and
6. Packaging that is extremely susceptible to leakage.

All these factors generally contribute to wide performance variations between devices that are made with the same process. Moreover, the cost of the resultant supercapacitors limits the range of products to which they can be commercially applied.

Any discussion of the prior art throughout the specification should in no way be considered as an admission that such prior art is widely known or forms part of common general knowledge in the field.

BRIEF DESCRIPTION OF THE INVENTION

It is an object of the present invention, at least in the preferred embodiments, to overcome or substantially ameliorate one or more of the disadvantages of the prior art.

According to a first aspect of the invention there is provided a supercapacitor including:

a first electrode;

a separator sheet that is captively retained to the first electrode;

a second electrode being abutted against the separator sheet whereby the electrodes are maintained in a spaced apart configuration;

a housing for containing the electrodes, the separator sheet and an electrolyte for allowing ionic conduction between the electrodes; and two terminals connected to the respective electrodes for allowing external electrical connection to those electrodes.

According to a second aspect of the invention there is provided a supercapacitor including:

a first electrode;

a second electrode disposed adjacent to the first electrode;

a separator being captively retained only to the second electrode for maintaining the electrodes in a spaced apart configuration;

a housing for containing the electrodes, the separator and an electrolyte for allowing ionic conduction between the electrodes; and two terminals connected to the respective electrodes for allowing external electrical connection to those electrodes.

According to a third aspect of the invention there is provided a supercapacitor including:

a first electrode;

a second electrode disposed adjacent to the first electrode;

a separator being captively retained to the second electrode and not the first electrode for maintaining the electrodes in a spaced apart configuration;

a housing for containing the electrodes, the separator and an electrolyte for allowing ionic conduction between the electrodes; and two terminals connected to the respective electrodes for allowing external electrical connection to those electrodes.

According to a fourth aspect of the invention there is provided an energy storage device including:

a first electrode;

a second electrode disposed adjacent to the first electrode;

a separator being retained to the second electrode under tension for maintaining the electrodes in a spaced apart configuration;

a housing for containing the electrodes, the separator and an electrolyte for allowing ionic conduction between the electrodes; and two terminals connected to the respective electrodes for allowing external electrical connection to those electrodes.

According to a fifth aspect of the invention there is provided an energy storage device including:

a first electrode;

a second electrode disposed adjacent to the first electrode, the second electrode having at least one edge;

a separator having two opposed faces that sandwich the second electrode and which are abutted and joined together at the edge for maintaining the electrodes in a spaced apart configuration;

a housing for containing the electrodes, the separator and an electrolyte for allowing ionic conduction between the electrodes; and two terminals connected to the respective electrodes for allowing external electrical connection to those electrodes.

Preferably, the second electrode includes at least three edges and the opposed faces are abutted and joined together at all those edges. More preferably, the opposed faces are abutted and joined together along less than the entirety of each edge.

Preferably, the separator includes two porous sheets that are peripherally connected to each other.

Preferably also, the second electrode is a sheet electrode having a first side, a second side that is opposed to the first side, and a common peripheral edge joining the first side and the second side, and the separator includes:

a first porous sheet that extends across the first side and which includes at least one first edge that protrudes beyond the common peripheral edge; and a second porous sheet that extends across the second side and which includes at least one second edge that protrudes beyond the common peripheral edge wherein the first and second edges are connected for captively retaining the separator to the second electrode.

In a preferred form, the connection of the first and the second edges involves bonding those edges together. More preferably, the bonding includes heat welding those edges together. In alternative embodiments, however, the bonding includes adhering those edges together. In still further embodiments the bonding includes heat sealing the edges together.

Preferably, the device includes:

a like plurality of first and second electrodes that are alternated with each other and contained within the housing, all the first electrodes being electrically connected to one of the terminals and all the second electrodes being connected to the other terminal; and a plurality of like separators each extending about a respective second electrode to maintain that electrode in a spaced apart configuration from the or each adjacent first electrode.

Preferably, also, the second electrode is formed from a continuous longitudinally extending conductive sheet having a plurality of spaced apart transverse slots and the porous sheets are connected to each other through the slots. More preferably, the conductive sheet is cut transversely through the slots to provide a plurality of separate sub-electrodes. Even more preferably, the slots are equally longitudinally spaced apart and the sub-electrodes are substantially equivalent.

In a preferred form, the first electrode includes a plurality of separate sub-electrodes that are stacked together alternately with a corresponding plurality of sub-electrodes of the second electrode. More preferably, each sub-electrode includes an electrode area and the sub-electrodes of the first and the second electrodes include respective first and second tabs extending outwardly from the corresponding electrode areas. Even more preferably the sub-electrodes are stacked such that the electrode areas of all the electrodes overlap and the first tabs overlap each other and are electrically connected and the second tabs overlap each other and are electrically connected, whereby the first tabs and the second tabs do not overlap each other.

Preferably, the separator includes two flexible sheets each of which define one of the opposed faces. More preferably, the sheets are porous. Even more preferably, the opposed faces, in use, are maintained in tensioned abutment against the second electrode.

According to a sixth aspect of the invention there is provided a method of forming a supercapacitor, the method including:

providing a first electrode;

captively retaining a separator sheet to the first electrode;

abutting a second electrode against the separator sheet whereby the electrodes are maintained in a spaced apart configuration;

containing in a housing the electrodes, the separator sheet and an electrolyte for allowing ionic conduction between the electrodes; and connecting two terminals to the respective electrodes for allowing external electrical connection to those electrodes.

According to a seventh aspect of the invention there is provided a method of forming a supercapacitor, the method including:

providing a first electrode;

disposing a second electrode adjacent to the first electrode;

captively retaining a separator only to the second electrode for maintaining the electrodes in a spaced apart configuration;

containing in a housing the electrodes, the separator and an electrolyte for allowing ionic conduction between the electrodes; and connecting two terminals to the respective electrodes for allowing external electrical connection to those electrodes.

According to an eighth aspect of the invention there is provided a method of forming a supercapacitor, the method including:

providing a first electrode;

disposing a second electrode adjacent to the first electrode;

captively retaining a separator to the second electrode and not the first electrode for maintaining the electrodes in a spaced apart configuration;

containing in a housing the electrodes, the separator and an electrolyte for allowing ionic conduction between the electrodes; and connecting two terminals to the respective electrodes for allowing external electrical connection to those electrodes.

According to a ninth aspect of the invention there is provided a method of forming an energy storage device including the steps of:

providing a first electrode;

disposing a second electrode adjacent to the first electrode;

retaining a separator under tension to the second electrode for maintaining the electrodes in a spaced apart configuration;

containing within a housing the electrodes, the separator and an electrolyte for allowing ionic conduction between the electrodes; and connecting two terminals to the respective electrodes for allowing external electrical connection to those electrodes.

According to a tenth aspect of the invention there is provided a method of forming an energy storage device including the steps of:

providing a first electrode;

disposing a second electrode adjacent to the first electrode, the second electrode having at least one edge;

providing a separator having two opposed faces that sandwich the second electrode and that are abutted and secured together at or adjacent to the edge for maintaining the electrodes in a spaced apart configuration;

retaining a separator under tension to the second electrode for maintaining the electrodes in a spaced apart configuration;

containing within a housing the electrodes, the separator and an electrolyte for allowing ionic conduction between the electrodes; and connecting two terminals to the respective electrodes for allowing external electrical connection to those electrodes.

According to an eleventh aspect of the invention there is provided an electrode pair for a supercapacitor, the electrode pair including:

a first sheet electrode having a conductive energy storage element with an outer surface and a separator sheet being captively retained in abutment with the surface; and a second sheet electrode having a conductive energy storage element with an outer surface that is abutted with the separator sheet whereby the elements are maintained in a spaced apart configuration.

According to a twelfth aspect of the invention there is provided an electrode for an energy storage device, the electrode including:

a conductive energy storage element having an outer surface; and a separator being retained in abutment with the surface under tension.

According to a thirteenth aspect of the invention there is provided an electrode for an energy storage device, the electrode including:

a conductive energy storage element having at least one edge; and a separator having two opposed faces that sandwich the element and that are abutted and secured together at the edge.

Preferably, the separator includes two flexible sheets each of which define one of the opposed faces. More preferably, the sheets are porous. Even more preferably, the opposed faces, in use, are maintained in tensioned abutment against the second electrode.

According to a fourteenth aspect of the invention there is provided an electrode for an energy storage device, the electrode being formed from a continuous conductive sheet having a first face, a second face opposite the first face and a plurality of openings extending between the faces, the electrode including:

a first energy storage element defined by or mounted to some or all of the first face; and a separator extending across the first element and at least some of the second face, the separator being attached to itself through the openings for maintaining the separator adjacent to the sheet.

Preferably, the electrode of the fourteenth aspect includes a second energy storage element defined by or mounted to at least part of the second face, wherein the separator extends across the second element.

According to a fifteenth aspect of the invention there is provided an electrode for an energy storage device, the electrode being formed from a continuous conductive sheet having a first face, a second face spaced apart from the first face and a plurality of openings extending between the faces, the electrode including:

a first energy storage element defined by or mounted to some or all of the first face;

a second energy storage element defined by or mounted to some or all of the second face; and a separator extending across the first and the second elements and being attached to itself through the openings.

Preferably, the sheet extends longitudinally and the openings are transverse slots. More preferably, the slots are longitudinally spaced apart and parallel. Even more preferably, each slot is equally longitudinally spaced apart from the adjacent slots.

Preferably also, the sheet includes two transversely spaced apart longitudinal edges and the slots extend from one edge and terminate adjacent to the other edge. More preferably, the sheet includes two transversely spaced apart longitudinal edges and the slots extend inwardly from both edges and terminate adjacent to each other.

In a preferred form, the sheet includes two transversely spaced apart longitudinal edges and the slots terminate adjacent to both edges.

According to a sixteenth aspect of the invention there is provided an energy storage device including:

a plurality of first electrodes that have been separated from a continuous longitudinally extending sheet, the sheet having a plurality of longitudinally spaced apart transversely extending slots that extend between adjacent ones of the electrodes;

a plurality of second electrodes that are opposed with at least one of the first electrodes;

a separator being disposed between the electrodes for maintaining the electrodes in a spaced apart configuration;

a housing for containing the electrodes, the separator and an electrolyte for allowing ionic conduction between the electrodes; and two terminals connected to the respective electrodes for allowing external electrical connection to those electrodes.

According to a seventeenth aspect of the invention there is provided a method for forming an energy storage device from a continuous longitudinally extending conductive sheet of a predetermined transverse width, the method including the steps of:

forming a plurality of longitudinally spaced apart transverse slots in the sheet, wherein the slots have a transverse extent less than the predetermined transverse width to define a plurality of sequentially linked first electrode plates;

engaging a separator with the electrode plates, the plates each including a tab portion that extends transversely beyond the separator;

separating the electrode plates;

connecting the tab portions to each other to electrically connect the electrode plates;

arranging the first electrode plates with a plurality of second electrode plates in a predetermined configuration;

disposing the electrode plates within a housing containing an electrolyte for allowing ionic conduction between the plates; and connecting two terminals to the respective pluralities of electrode plates for allowing external electrical connection to those plates.

Preferably, the sheet includes two opposite transverse edges that are spaced apart by the predetermined width and the method includes the step forming the slots such that they extend from one of the transverse edges and terminate adjacent to the other edge.

More preferably, the step of engaging the separator with the plates includes sandwiching the plates between two opposed separator sheets. More preferably, the separator sheets are retained in tensioned engagement with the plates.

In a preferred form, the method includes the further step of engaging the two opposed separator sheets with each other through the slots. More preferably, the method includes the further step of joining the two opposed separator sheets with each other through the slots. Even more preferably, the joining of the separator sheets is by way of bonding.

In some embodiments the bonding is by way of heat sealing. In other embodiments the bonding is by way of heat welding. More preferably, the heat sealing or welding extends longitudinally across substantially all the slot. Even more preferably, the heat sealing or welding extends transversely across substantially all the slot.

In other embodiments the heat sealing is affected at two or more spaced apart locations in the slot.

In a preferred form the method includes the step of alternately stacking the first and the second plurality of plates with each other. More preferably, the method includes the step of stacking the first and the second plurality of plates with each other in a single stack.

In a preferred form, the method includes the step of applying a coating to the sheet, wherein the coating includes activated carbon particles and a binder.

According to an eighteenth aspect of the invention there is provided an energy storage device including:

a plurality of first electrode plates that have been separated from a continuous longitudinally extending conductive sheet;

a separator engaged with the electrode plates, the plates each including a tab portion that extends transversely beyond the separator and which are connected to each other to electrically connect the electrode plates;

a plurality of second electrode plates being arranged with the first electrode plates in a predetermined configuration;

a housing for containing the electrode plates and an electrolyte for allowing ionic conduction between the plates; and two terminals being connected to the respective pluralities of tab portions for allowing external electrical connection to those plates.

According to a nineteenth aspect of the invention there is provided an energy storage device including:

a first longitudinally extending sheet electrode;

a second longitudinally extending sheet electrode being opposed to and transversely displaced with respect to the first electrode to define an overlap, wherein the electrodes include respective free edges that extend transversely outwardly from the overlap and away from each other;

a separator being disposed intermediate the electrodes and extending across at least the overlap for maintaining the electrodes in a spaced apart configuration, the separator being folded together with the electrodes such that the free edges are folded onto themselves to define respective multi-layer tabs;

a housing for containing the electrodes, the separator and an electrolyte for allowing ionic conduction between the electrodes; and two terminals connected to the respective tabs for allowing external electrical connection to the respective electrodes.

Preferably, the separator and the electrodes are folded together into a flat spiral. More preferably, the tabs include a plurality of layers that abut. Even more preferably, the separator and the electrodes, when folded together, have a first longitudinal extent and the tabs have a second longitudinal extent which is less than the first longitudinal extent.

Preferably also, respective portions are removed from the free edges such that the second longitudinal extent is less than one half of the first longitudinal extent. More preferably, the second longitudinal extent is less than one third of the first longitudinal extent.

In a preferred form, the tabs are both adjacent to a longitudinal edge of the device. More preferably, the layers of the tab are electrically connected.

Preferably, adjacent layers of the tab are abutted and secured to each other. More preferably, the securement is by ultrasonic welding.

According to a twentieth aspect of the invention there is provided an energy storage device including:

a first electrode;

a second electrode being opposed to the first electrode;

a separator being disposed intermediate the electrodes for maintaining the electrodes in a spaced apart configuration;

a housing for containing the electrodes, the separator and an electrolyte for allowing ionic conduction between the electrodes;

a pair of spaced apart openings in the housing; and two terminals disposed within the housing and being, at one end, electrically connected to the respective electrodes and, at the other end, covering the openings and being sealingly engaged with the housing about the periphery of the openings, whereby the terminals are accessible through the respective openings to allow external electrical connection to the electrodes.

Preferably, the terminals include two opposite planar faces and the housing includes two opposed sidewalls, whereby one of the sidewalls includes the pair of openings and each of the sidewalls is sealingly engaged with one face of each terminal. More preferably, each of the sidewalls has a pair of the spaced openings and wherein those openings are covered by respective faces of the terminals.

Preferably also, the sidewalls are peripherally connected. More preferably, the sidewalls are integrally connected about at least a portion of their peripheries. Even more preferably, the remainder of the portion of the peripheries are sealingly engaged. In the preferred embodiments the sealing engagement is by heat sealing.

In a preferred form, the terminals include respective protrusions that extends through the respective openings for facilitating external electrical connection to the electrodes.

According to a twenty first aspect of the invention there is provided an energy storage device including:

an energy storage element having two electrodes;

two terminals extending from the element for allowing electrical connection to the electrodes; and a housing for containing the element, the terminals and an electrolyte for allowing ionic conduction between the electrodes, the housing being folded.

Preferably, the housing is folded along a fold line that is at or adjacent to and substantially parallel with and edge of the element whereby the element lies on one side of the fold line and a folded portion lies on the other side of the fold line. More preferably, the housing is folded along more than one spaced apart fold lines and the respective folded portions overlie the element. Even more preferably, the folded portions do not overlie each other.

In a preferred form, the folded portions are folded toward each other. More preferably, the fold line passes through a terminal.

In some embodiments the device includes two folded portions having respective openings that are covered and sealed by respective terminals whereby the terminals are electrically accessible via the respective openings. More preferably, the device includes at least one contact that is secured to one of the terminals through the respective opening whereby the contact is sandwiched between the folded portion and the element.

According to a twenty second aspect of the invention there is provided a composite energy storage component including two like devices of the twenty first aspect wherein the terminals extend from a respective one of the electrode of the devices and the other of the electrodes of the devices being adjacent to each other and electrically connected.

Preferably, all the folded portions are disposed intermediate the elements to define a folded configuration for the component. More preferably, the component includes a mounting member for retaining the component in the folded configuration.

Preferably also, the other of the electrodes of the devices are electrically connected via one or more like devices of the seventeenth aspect.

According to a twenty third aspect of the invention there is provided an energy storage device including:

a housing;

an energy storage element being sealingly contained within the housing;

a mount that extends about and captively engages the housing; and two terminals that extend from the energy storage element and terminate outside the housing for allowing external electrical connection to the element.

Preferably, the mount includes a support frame for receiving the housing and at least one locking element that extends from the frame for captively engaging the housing within the support frame. Preferably also, the locking element is integrally formed with the frame and is deformed into abutment with the housing to captively engage the housing within the support frame. Even more preferably, the housing is retained within the frame in a folded configuration.

According to a twenty fourth aspect of the invention there is provided an energy storage device including:

a folded housing;

at least one energy storage element being sealingly contained within the housing;

a mount that extends about and captively retains the housing in the folded configuration; and two terminals that extend from the energy storage element and terminate outside the housing for allowing external electrical connection to the element.

According to a twenty fifth aspect of the invention there is provided an energy storage device including:

a plurality of first electrodes having respective first surfaces of a first area;

a plurality of second electrodes having respective second surfaces of a second area, the electrodes being stacked such that the second surfaces are opposed to respective first surfaces whereby the opposed surfaces collectively define respective overlapped portions having a third area that is less than the first and the second areas;

a separator having a first edge and a second edge transversely spaced apart from the first edge, the separator being disposed between the surfaces and extending across at least the overlapped portion for maintaining the electrodes in a spaced apart configuration, wherein the first electrodes each include a first tab that extends beyond the first edge and the second electrodes each include a second tab that extends beyond the second edge;

a housing for containing the electrodes, the separator and an electrolyte for allowing ionic conduction between the electrodes; and two terminals being respectively electrically connected to the first and the second tabs and being accessible from outside the housing for allowing external electrical connection to the electrodes.

Preferably, the first and the second surfaces include respective carbon coatings at least in the overlapped portion. More preferably, the first and the second electrodes are longitudinally extending sheet electrodes. Even more preferably, the electrodes are stacked together. In other embodiments, however, the electrodes are wound together about a transverse winding axis.

Preferably, in the stacked configuration, each electrode is substantially planar.

In a preferred form, the first tabs are connected together to define a first collective tab that is disposed beyond the first edge and the second tabs are connected together to define a second collective tab that is disposed beyond the second edge, wherein the first and the second collective tabs are electrically connected to respective terminals.

Preferably, the first and the second edges are parallel and the first and the second collective tabs extend outwardly and away from each other.

Preferably also, the separator includes a plurality of separate porous sheets. More preferably, the sheets are joined at adjacent peripheral edges.

According to a twenty sixth aspect of the invention there is provided a mount for an energy storage device, the mount including:

a frame member having an opening for receiving the device; and one or more tabs extending from the frame member for selectively preventing progression of the device through the opening.

Preferably, the tabs are movable between an open configuration and a closed configuration in which the device is respectively allowed and prevented from movement through the opening. More preferably, the tabs are integrally formed with the frame and are deformed into the open and the closed configurations. More preferably, the deformation reversible. In other embodiments, however, the tabs are only deformable once. That is, the tabs are originally in the open configuration and are deformed once into the closed configuration once the device is received within the frame.

According to a twenty seventh aspect of the invention there is provided a housing for an energy storage device having at least one terminal, the housing including:

a first plastics layer for enclosing the device and which is bonded to the terminal over a contact area;

a barrier layer exterior to the plastics layer;

a second plastics layer exterior to the barrier layer;

an opening through the layers for allowing access to the terminal, wherein the terminal covers the opening and the contact area surrounds the opening; and a filler material intermediate the first plastics layer and the terminal and spread over at least the contact area.

According to a twenty eighth aspect of the invention there is provided a terminal for an energy storage device, the terminal including:

a conductive contact surface;

a first plastics layer for abutting and sealingly engaging the surface;

a barrier layer exterior to the plastics layer;

a second plastics layer exterior to the barrier layer; and an opening through the layers for allowing electrical access to the surface.

According to a twenty ninth aspect of the invention there is provided a housing for an energy storage device having at least one terminal, the housing including:

a first plastics layer for enclosing the device and which is bonded to the terminal over a contact area;

a barrier layer exterior to the plastics layer;

a second plastics layer exterior to the barrier layer;

an opening through the layers for allowing access to the terminal, wherein the terminal spans the opening; and a filler material intermediate the first plastics layer and the terminal and spread over at least the contact area.

According to a thirtieth aspect of the invention there is provided an energy storage device including:

an energy storage cell;

a housing for containing the cell, the housing having two abutted portions that are sealed together, wherein the abutted portions are of substantially uniform collective thickness; and two terminals connected to the cell for allowing external electrical connection with the cell.

Preferably, the housing includes two openings that are covered by the respective terminals and two sealing portions that surround and are adjacent to the openings. More preferably, the terminals are planar and the sealing portions overlie and are sealingly engaged with the terminals. More preferably, that sealing engagement is effected by heat.

Preferably also, the housing includes a barrier sheet having a first peripheral edge and a second peripheral edge, wherein the sheet is folded upon itself so that the peripheral edges define the respective abutted portions.

BRIEF DESCRIPTION OF THE DRAWINGS

Preferred embodiments of the invention will now be described, by way of example only, with reference to the accompanying drawings. All the drawings are schematic and none are to scale. Particularly:

FIG. 2a is a cross sectional view of the supercapacitor of FIG. 2 taken along line 2a–2a;

FIG. 15b is a view similar to that of FIG. 15, illustrating an alternative sheet;

DETAILED DESCRIPTION OF PREFERRED EMBODIMENTS

Figures 1, 1A:
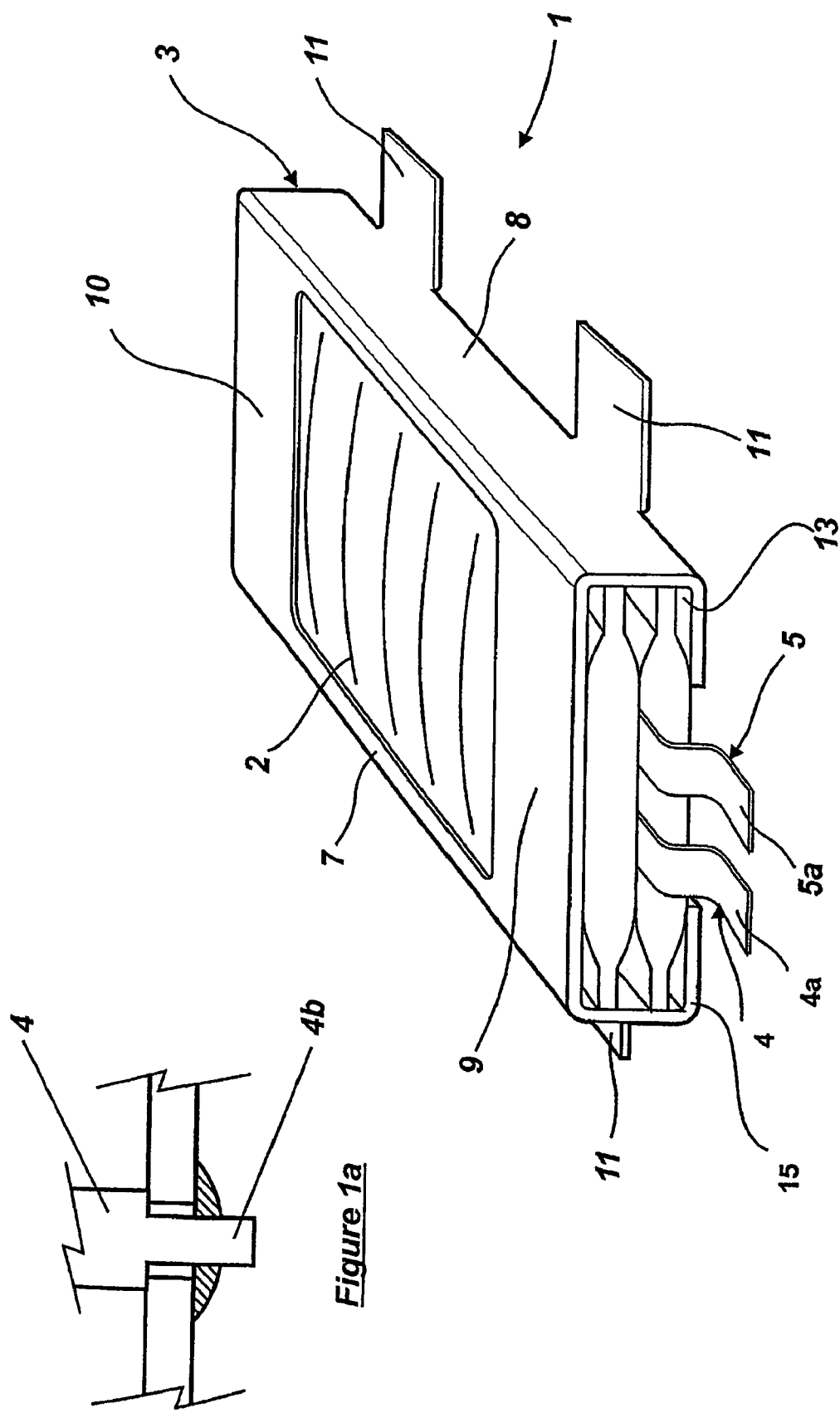
FIG. 1 is a top perspective view of a supercapacitor according to the invention.
FIG. 1a is an enlarged front view of an alternative contact for the supercapacitor of FIG. 1.

Referring to FIG. 1 there is illustrated a surface mount energy storage device in the form of a supercapacitor 1. The supercapacitor includes a generally rectangular folded prismatic housing 2 and two energy storage elements (not shown) that are sealingly contained within the housing and which are connected in series. A mount, in the form of an integrally formed tinned metal frame 3, extends about and captively retains housing 2 in the folded configuration shown. Two terminals, in the form of elongate contacts 4 and 5 extend from the energy storage elements and terminate outside housing 2 for allowing external electrical connection to the elements.

In this embodiment contacts 4 and 5 are formed into an S-shape and have planar ends 4a and 5a that are soldered or otherwise surface mounted to a PCB. However, in other embodiments, such as that shown in FIG. 1a, the contacts extend downwardly and through corresponding located apertures in the PCB. In this case, the ends, as illustrated by the end numbered 4b, are soldered to the side of the PCB that is opposite to supercapacitor 1. In still further embodiments the ends 4a and 5a are turned inwardly and toward each other.

Frame 3 includes two like and parallel elongate planar side members 7 and 8 that are interlinked by two spaced apart transverse members 9 and 10. Frame 3 also includes four spaced apart feet 11 that extend outwardly from members 7 and 8 for defining substantially planar contacts that are abutted and soldered to a PCB. Other forms of attachments will be understood by those skilled in the art to be equally applicable.

In some embodiments frame 3 is integrally formed from another metal such as aluminium. In still further embodiments the frame is constructed from a plastics material.

Figure 2:
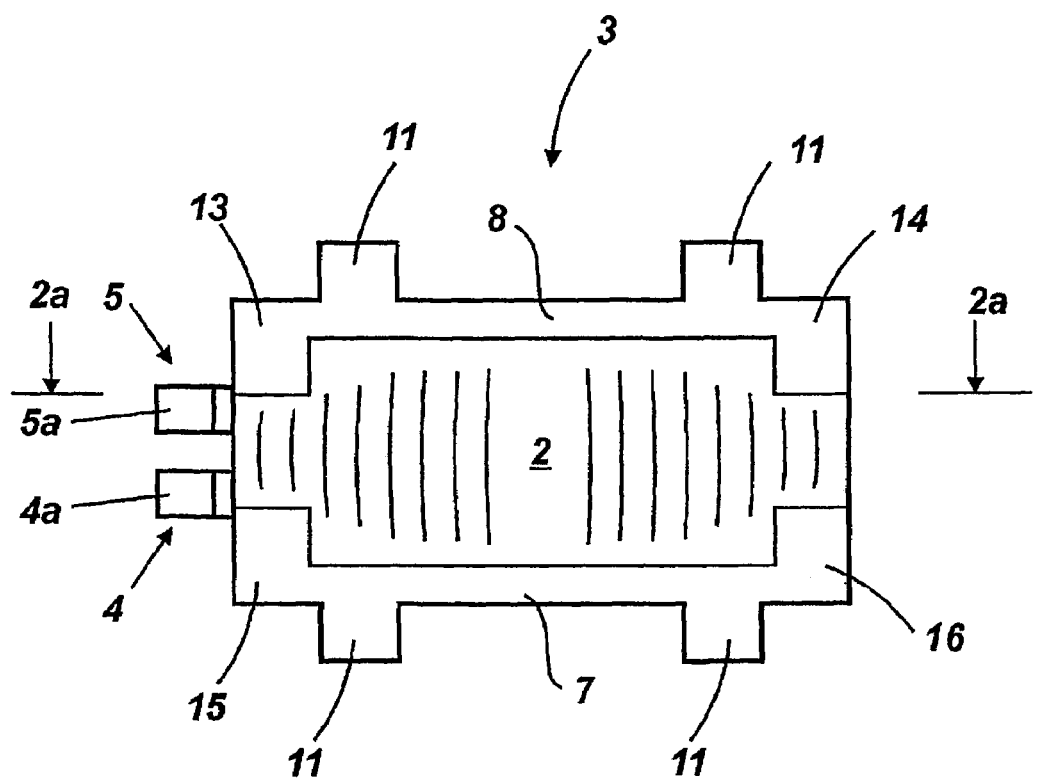
FIG. 2 is an underside view of a supercapacitor of FIG. 1.

As best shown in FIG. 2, frame 3 also includes four spaced apart and opposed retention tabs 13, 14, 15 and 16 that respectively extend normally from one of frame members 7 and 8 and toward the other of those members. The tabs are initially parallel with the respective member from which they extend to leave an opening that extends between members 7 and 8. The folded housing 2 is inserted through this opening and abutted against members 9 and 10. Thereafter, tabs 13 to 16, which are integrally connected with respective members 7 and 8, are deformed into the configuration illustrated in FIGS. 1, 2 and 2a. This deformation is effected either manually or, more preferably, by means of automation In some embodiments the deformation of the tabs occurs simultaneously, while in other embodiments it occurs sequentially.

Figure 2A:
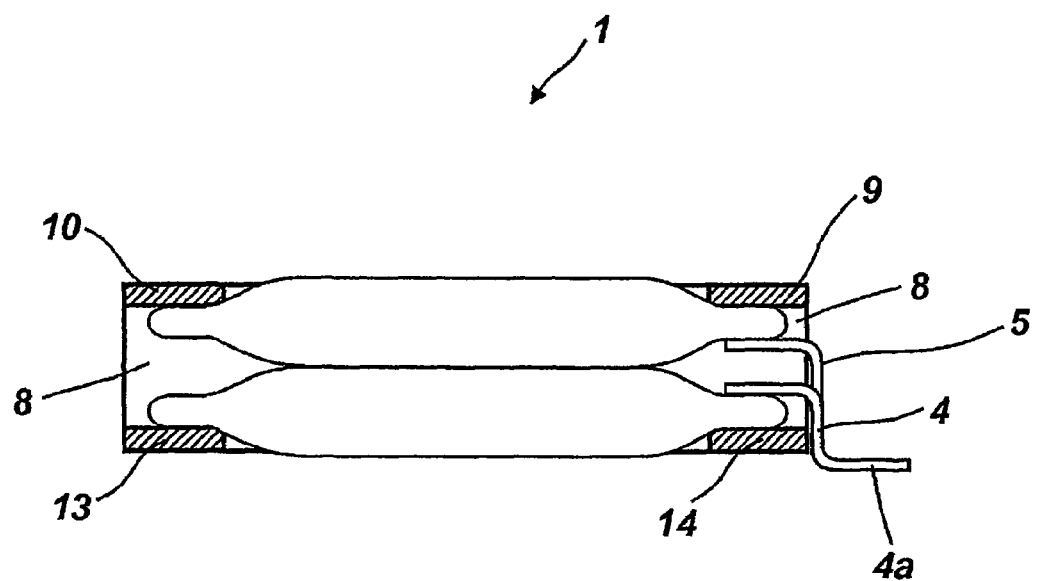

Reference is now made to FIG. 2a which shows a cross sectional view of supercapacitor 1. More particularly, housing 2 is folded so that the two energy storage elements are disposed centrally. Accordingly, housing 2 is thinnest at the regions adjacent to members 9 and 10. It is in these thinner regions that member 9 and 10 extend. Similarly, tabs 13, 14, 15 and 16 are deformed into these thinner regions so that the contribution of frame 3 to the overall thickness of the supercapacitor is minimised. That is, advantage is taken of the non-uniform thickness of the housing in the folded configuration.

Frame 3 is punched from a single metal blank that is deformed into the desired configuration. That is, all members, tabs and feet are integrally formed. In other embodiments frame 3 is constructed from other metals and it is also envisaged that other materials such as plastics are suitable. In the latter case it is necessary to glue or otherwise adhere the plastics tabs to the frame. Alternatively, moveable plastics tabs are possible, although at the cost of complexity.

The construction and packaging of supercapacitor 1 will now be described in more detail. It will be clear from the following description that this embodiment offers considerable scope for variation of the packaging and as such accommodates a wide variety of applications. It will also be clear that the construction and packaging of supercapacitor 1 is ideally suited to automation.

Figure 3:
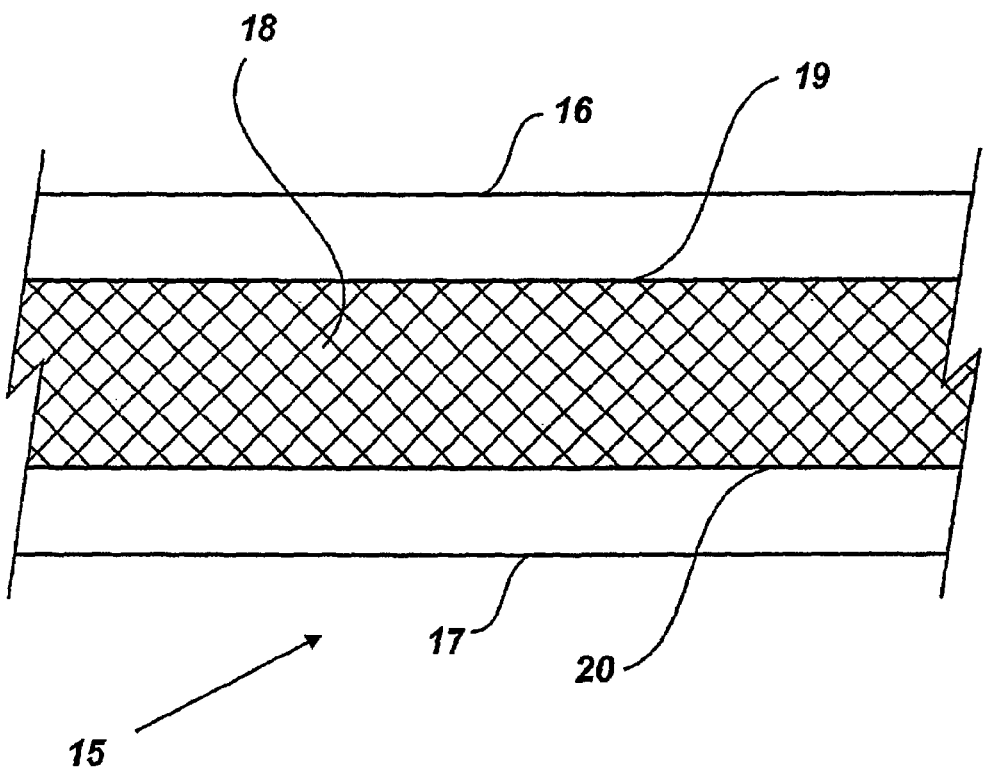
FIG. 3 is a plan view of a carbon coated aluminium sheet that is used to produce an electrode for the supercapacitor of FIG. 1.

Referring to FIG. 3 there is illustrated in plan view a longitudinally extending aluminium sheet 15 that is used to produce an electrode for the supercapacitor of FIG. 1. Sheet 15 is continuous and includes two longitudinally extending edges 16 and 17 that are transversely spaced apart by 31.5 mm. Sheet 15 also includes a centrally applied continuous carbon coating 18 that has two transverse edges 19 and 20 that are spaced apart by 15.5 mm As will be appreciated by those skilled in the art, the carbon coating is used to provide a high surface area for the electrode. The coating in this embodiment includes:

carbon particles to provide high surface area and conductivity; and a binder to bind the carbon particles to each other and to the sheet.

Many other coatings or combination of constituents within the coating are possible. Additionally, for different end applications use is made of different coating thicknesses and different sheet dimensions.

Figure 4:
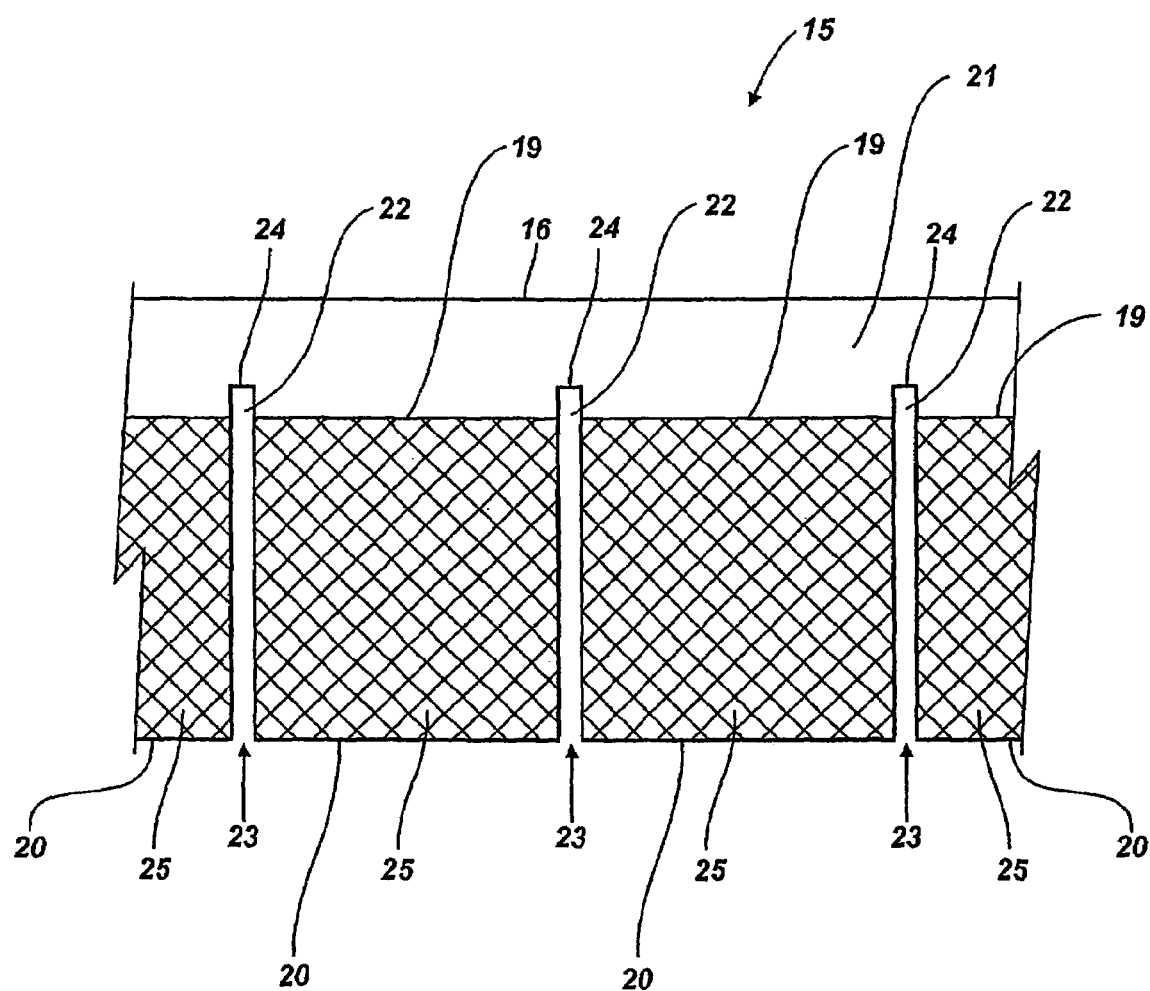
FIG. 4 is a plan view of the sheet of FIG. 3 with a plurality of slots.

Sheet 15 is passed to a forming station (not shown) where edge 20 is trimmed, as shown in FIG. 4, such that edge 20 defines the periphery of the sheet. In other embodiments edge 17 is trimmed less and lies closely adjacent to edge 20.

As also shown in FIG. 4, edge 16 remains untrimmed so that sheet 15 defines a common conductive tab 21 that lies between edges 16 and 19. This tab is about 8 mm wide and its function will be described in more detail below.

The same forming station that trim sheet 15 also removes selected portions of the sheet to define a plurality of equally longitudinally spaced apart transverse slots 22. The slots extend linearly between respective open ends 23 that are co-terminus with edge 20 and closed ends 24 that are intermediate edge 19 and edge 16. The slots extend at least between edges 19 and 20 to segment coating 18 into a plurality of like sub-electrodes 25 that extend longitudinally between adjacent slots. A skilled addressee will understand from the disclosure within this specification that a variety of slot configurations are possible to achieve this end effect of segmentation. For example, slots 22 need not be normal to edges 16, 19 and 20.

In further embodiments end 24 is co-terminus with edge 19, while in further embodiments end 24 is closer to edge 16 than is the case for the embodiment of FIG. 4. Moreover, in some embodiments where edge 17 protrudes beyond edge 20 following the trimming step referred to above, end 23 is closed.

Sub-electrodes 25 have a longitudinal extent of about 12 mm. Moreover, slots 22 are about 2 mm wide. In other embodiments the sub-electrodes and the slots have different dimensions.

As shown, slots 22 have a traverse extent less than that of sheet 15. That is, tab 21 is continuous and defines a link between adjacent sub-electrodes 25. The advantages of this arrangement are many fold and will become more apparent from the description below of the other manufacturing steps. However, of particular note is the excellent indexing that the slots provide in those other steps. That is, the regular longitudinal spacing of the slots provides a convenient reference for the speed and extent of travel of sheet 15 through the subsequent steps. This, in turn, allows a finer control of those steps and further enhances the suitability of the preferred embodiments to mass manufacturing and automated manufacturing techniques.

Figure 5:
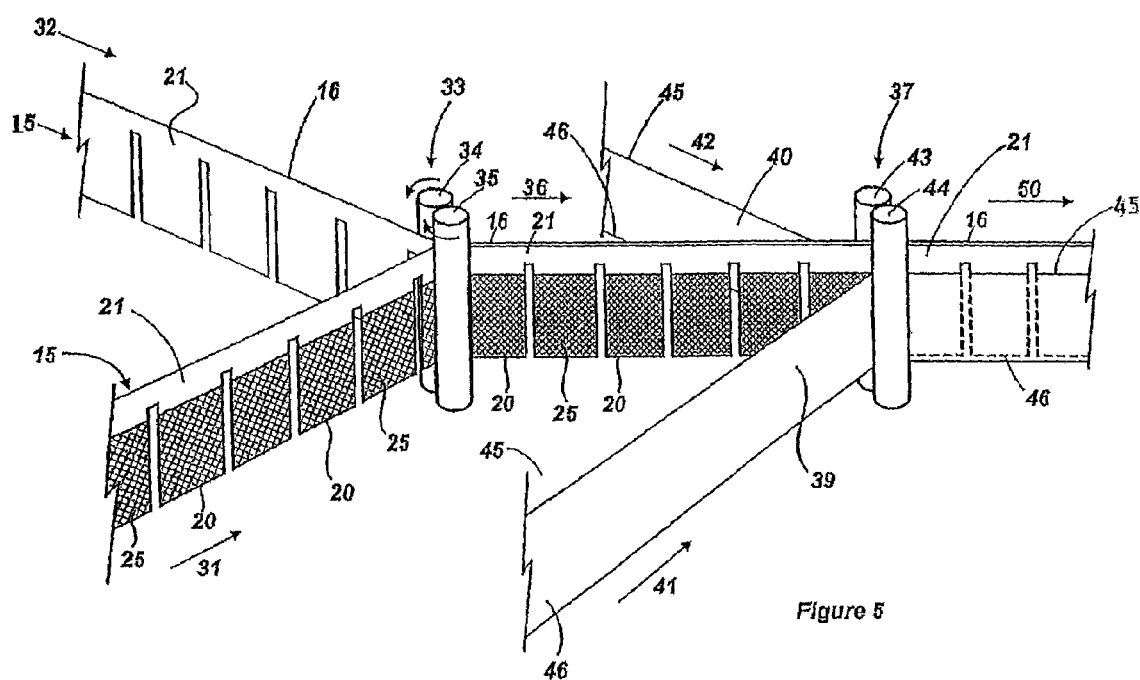
FIG. 5 is a perspective view of some steps in a manufacturing process according to the invention.

Referring now to FIG. 5, there is illustrated schematically some further processing steps. Particularly, two like sheets 15 are arranged in a back-to-back configuration and feed continuously in the direction of arrows 31 and 32 into a forming station 33. As shown, the carbon coating on both sheets 15 is outwardly facing and each slot coincides with one slot on the other sheet. That is, each slot directly overlies a corresponding slot in the other sheet.

In other embodiments the trimming of sheets 15 and the forming of the slots 22 does not occur until after those sheets leave station 33. However, as described above, it is preferred that slots 22 are formed at the earliest possible opportunity to provide a reference for movement of sheets 15 through the subsequent steps.

Station 33 includes two counter rotating rollers 34 and 35 that progress the two sheets 15 into engagement such that edges 16 are abutted and aligned. In some embodiments the back of one or both of the sheets includes some contact adhesive to facilitate a secure engagement between the sheets once they have passed through station 33. However, in this embodiment that is not required as the sheets are sufficiently retained together by friction and the tension inherent in the manufacturing process.

In further embodiments, use is made of a single sheet 15 that has two coatings 18, one on each opposite face. In this case, there is no need to include two sheets 15 in the back-to-back configuration referred to above.

After sheets 15 leave station 33 they are drawn in the direction of arrow 36 into station 37. Simultaneously with this, two aligned porous separator sheets 39 and 40 are drawn, under tension, in the direction of respective arrows 41 and 42 and into station 37. Sheets 39 and 40 are brought into engagement with the outwardly facing sides of sheets 15 and extend over all of the exposed coating 18. Sheets 39 and 40 are continuous and each have an upper edge 45 and a lower edge 46. These edges are spaced apart by 17.5 mm.

Station 37 also includes two counter rotating rollers 43 and 44 that progress all the sheets into engagement such that edges 46 are aligned and abutted about 1 mm below edge 20. This being the case, tab 21 and ends 24 of slots 22 protrude transversely beyond edges 45 of sheets 39 and 40. In less preferred embodiments sheets 39 and 40 extend transversely across all of tab 21.

The sheets 15 are feed into station 33 from electrode feed rolls (not shown) that are maintained at or about a first predetermined tension. Additionally, sheets 39 and 40 are feed into station 37 from separator feed rolls (also not shown) that are maintained at or about a second predetermined tension which is greater than the first tension. The reason for this will be explained below. It should be noted, however, that in some embodiments the tension applied to all the sheets is about the same.

Figure 6:
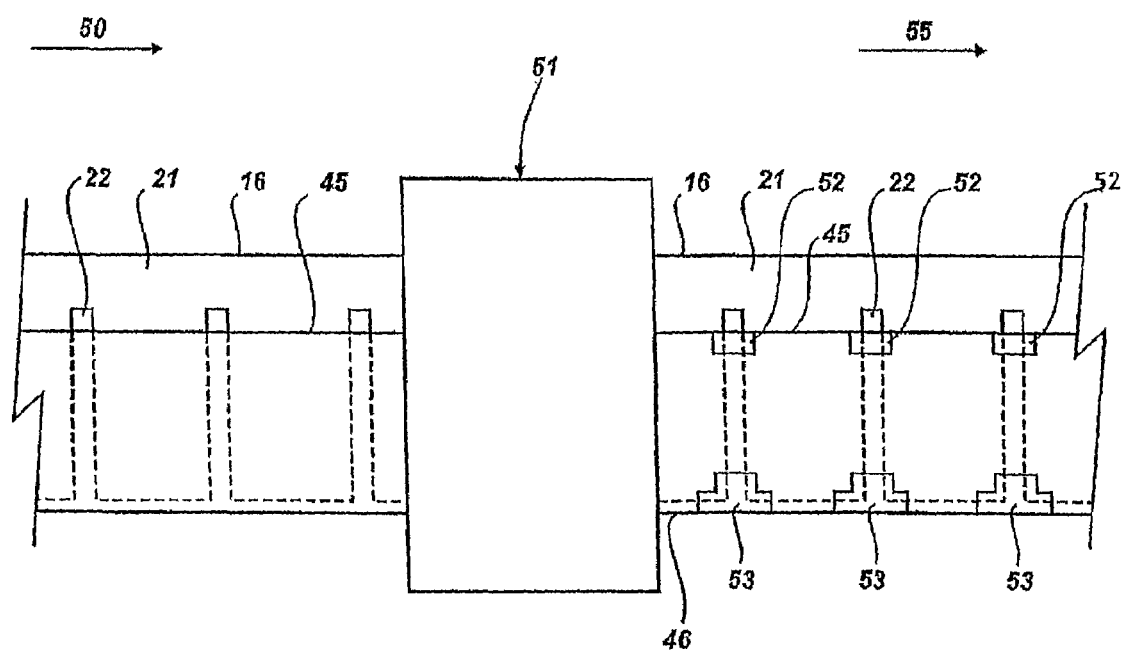
FIG. 6 is a plan view of some additional steps following the steps of FIG. 5.

After the abutted sheets leave station 37 they are progressed in the direction of arrow 50 to a further station 51 shown in FIG. 6. Station 51 is a heat forming station and it applies heat to the sheets in selected spaced apart areas that overlie or which are adjacent to slots 22. These areas are indicated by reference numerals 52 and 53. Areas 52 are disposed adjacent to edge 45 and end 24 of slots 22. Areas 53, however, extend inwardly from edge 46 and overlie ends 23 of slots 22.

The heat applied by station 51 in areas 52 and 53 is sufficient to heat and thermoform sheets 39 and 40. Where these sheets are abutted through the slots, the heat is sufficient to weld the sheets together. That is, sheets 39 and 40 become integrally engaged where areas 52 and 53 overlap with the underlying slots 22. Advantageously, that engagement occurs across the entirety of the longitudinal extent of the slots. That is, the sheets are abutted together all the way to the edges of sub-electrodes 25. However, it has been found that for the present embodiment it is not necessary to have the sheets 39 and 40 engaged along all their co-abutting areas.

Moreover, the heating operation within station 51, and the subsequent cooling of areas 52 and 53, is conducted while all the sheets are maintained under tension by the forming machinery. Accordingly, when the tension of the machinery is removed sheets 39 and 40 remain captured to the other layers due to the now integral securement through the slots.

The affecting of heat welding in areas 53 also adds structural rigidity to the combination of sheets which allows for a more robust handling of those sheets during the subsequent process steps.

The tensional strength of sheets 39 and 40 is relatively high and, further, they exhibit a certain degree of tensional resilience. This, in combination with the tensioned engagement, allows sheets 39 and 40 to bear any tensional loads preferentially to the aluminium sheets which are easily torn. As, in the configuration shown, sheets 39 and 40 create a continuous link between all the sub-electrodes and thereby contribute to the overall structural integrity of the combination of sheets.

In other embodiments the areas 52 and 53 are located differently. In one particular further embodiment to areas are joined, in that the thermoformed area extends substantially transversely across sheets 39 and 40.

Areas 52 and 53 are such as to ensure that the thermo-forming of sheets 39 and 40 occurs just beyond the slots and onto the adjacent sub-electrode 25. This ensures that the thermo-engagement between sheets 39 and 40 takes place right to the periphery of the slots. That is, to ensure that the sheets 39 and 40 remain under tension. The portions of the areas 52 and 53 that do not overlie the slots—that is the portions that overlie the sub-electrodes—are kept to a minimum.

Sheets 39 and 40 are thin porous membranes that act as physical and electrical separators for the coated aluminium sheets that define the adjacent electrodes in the supercapacitor. A variety of materials are suitable for use as a separator.

Each sub-electrode 25 includes a fixed edge defined by edge 19 and three free or unbounded edges. Sheets 39 and 40 are engaged with each other along the three free edges to not only maintain the tension in the sheets, but also to minimise the risk of relative transverse movement between sheets 15, 39 and 40 during the subsequent manufacturing steps. In other embodiments, sheets 39 and 40 are engaged against only two of the free edges, although preferably the two opposite free edges.

Area 52 is substantially rectangular and extends across the respective slot 22 and onto both the adjacent sub-electrodes 22 to optimise the retention between sheets 15, 39 and 40 and to ensure tension is retained in sheets 39 and 40. In other embodiments, area 52 is circular or another shape. In further embodiments, area 52 is contained wholly within the respective slot 22 and does not extend onto the adjacent sub-electrodes 22.

Area 53 is in the form of an inverted T-shape which, like area 52, extends across the respective slot 22 and onto both the adjacent sub-electrodes 22. Area 53 is disposed so as the heat engagement that is affected between sheets 39 and 40 extends up to and abuts the adjacent free edges of the respective sub-electrodes. That is, the abutment along the two adjacent free edges is affected by a heat applied in a single area, as opposed to having to provide heat to two separate areas.

Figure 7:
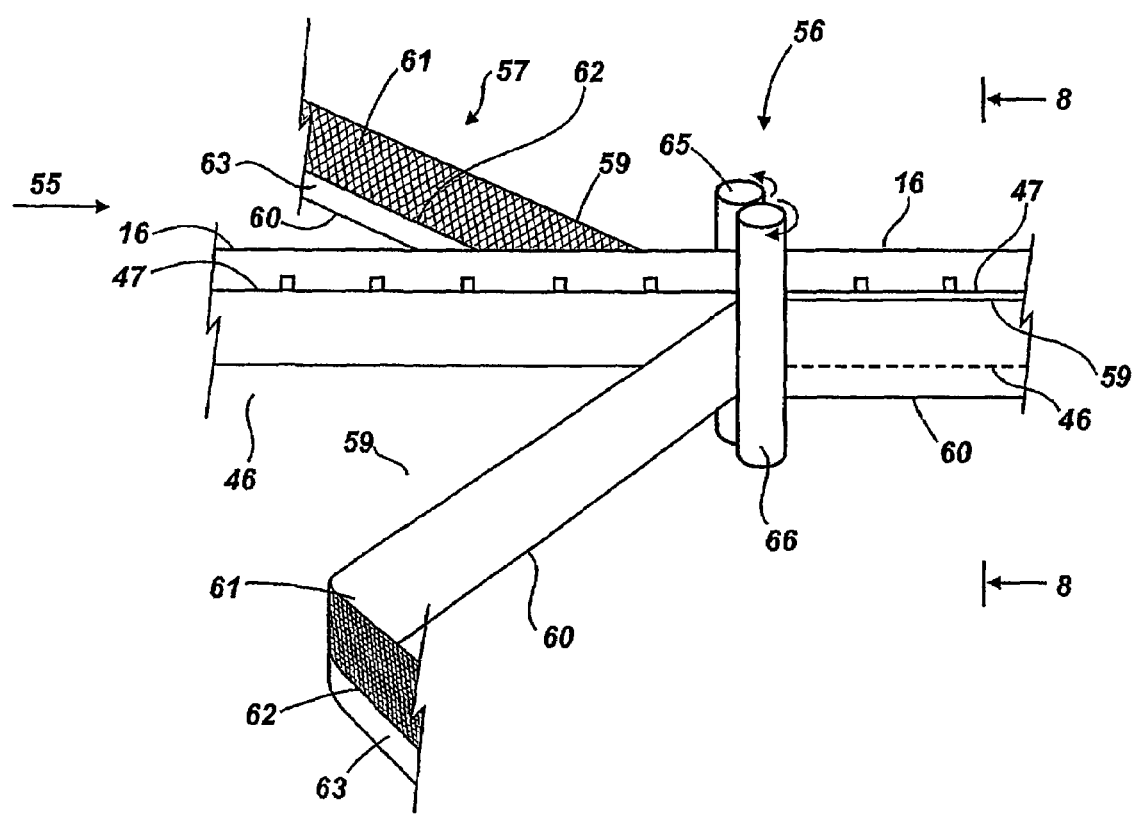
FIG. 7 is a perspective view of some process steps following the steps of FIG. 6.

After leaving station 51 the sheets move in the direction of arrow 55 and, as shown in FIG. 7, into a further station 56. Simultaneously, two continuous carbon coated aluminium sheets 57 and 58 are feed into station 56 to overlap with and partially sandwich the other sheets. The sheets 57 and 58 each include upper edges 59 and lower edges 60. Moreover, these sheets include a carbon coating 61 that extends from edge 57 and which terminates in an edge 62 that is spaced apart from edge 60. The space between edges 60 and 62 defines a continuous peripheral tab 63. In this embodiment, coating 61 is the same as coating 18.

Station 56 includes two counter rotating rollers 65 and 66 that apply compressive forces to the sheets as well as maintaining the sheets in tension.

The sheets are aligned such that, after leaving station 56, edge 59 is disposed adjacent to edge 47, although on the opposite side of edge 47 to edge 16. Additionally, both edges 60 extend transversely beyond edge 46 and preferably abut. In this configuration, coatings 18 are opposed with respective coatings 61. Preferably, the opposed coatings are directly superimposed. However, some transverse offset between coatings 18 and 61 is tolerable without adversely affecting the performance of the resultant supercapacitor.

Figure 8:
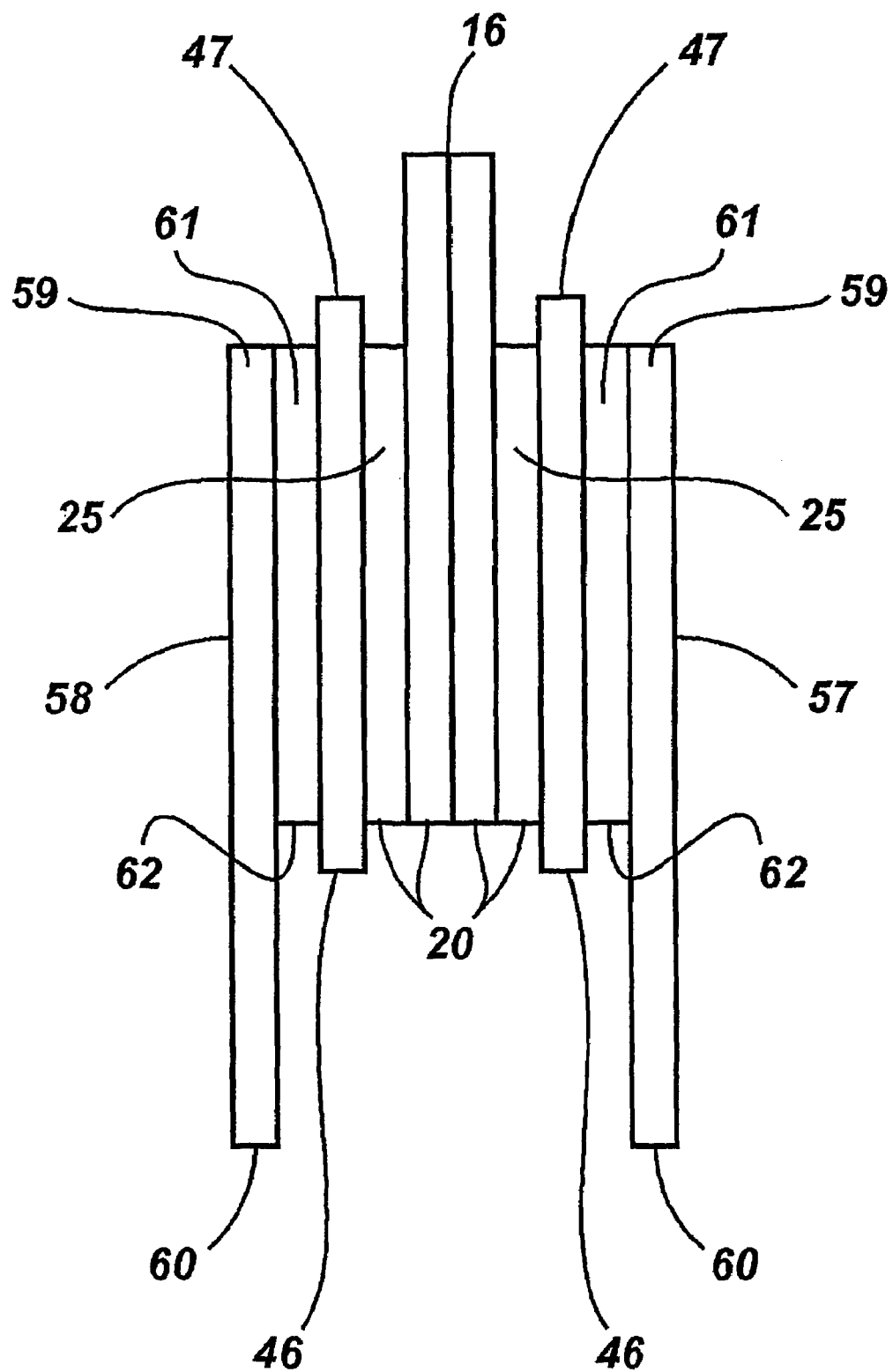
FIG. 8 is a cross section taken along line 8—8 of FIG. 7.

It will be appreciated from the above description that the continuous sheets that emerge from station 56 have a cross section as illustrated in FIG. 8. This Figure is not to scale or in proportion but rather schematic so as to more clearly illustrate the relative disposition of the sheets. Of particular interest is that edges 46 and 47 extend beyond the overlap that exists between the back-to-back sheets 15. These sheets 15 form a first pair and the opposed sheets 57 and 58 form a second pair. Sheets 39 and 40 ensure that the first pair of sheets are physically and electrically separated from the second pair of sheets.

After leaving station 56 the layered combination of sheets are cut transversely along respective cut lines that extend transversely through slots 22. While sheets 39, 40, 57 and 58 are cut across the entirety of their respective transverse extents, both sheets 15 are only cut across tabs 21. Importantly, these tabs do not overlie or overlap with either of sheets 57 and 58. This allows considerable tolerance to any non-ideal cutting that may take place. That is, if the cutting process is non-ideal and results in deformation of the sheets—as opposed to a clean cut—the chance of an electrical short being created between sheets 15 and either of sheets 57 and 58 is considerably reduced over known methods.

In the case of automated manufacture it is inevitable that the equipment used will operate across a range of tolerances and will progressively wear. With time, there is an increasing risk of non-ideal behaviour, one of which is the puncturing of one or more of sheets 39 and 40. The present embodiment is structured to ensure that the cuts performed, however non-ideal, are in a region in which there is no overlap of sheets 57 and 58 with sheets 15. The result is a manufacturing process that is less sensitive to the accuracy of the cut and, as such, one which lends itself to automation and higher yields.

The cutting of the sheets provides a plurality of electrode units having a cross section the same as that shown in FIG. 8 and a length equal to the distance between the centres of adjacent slots 22. These plurality of electrode units are stacked back-to-back so that the back of sheet 57 and 58 of one electrode unit are aligned and abutted with the back of a respective sheet 58 and 57 of another electrode unit. The number of units in the stack is dependent upon the capacitance that supercapacitor 1 is designed to provide. The greater the capacitance desired, the more units that will be required.

Figure 13:
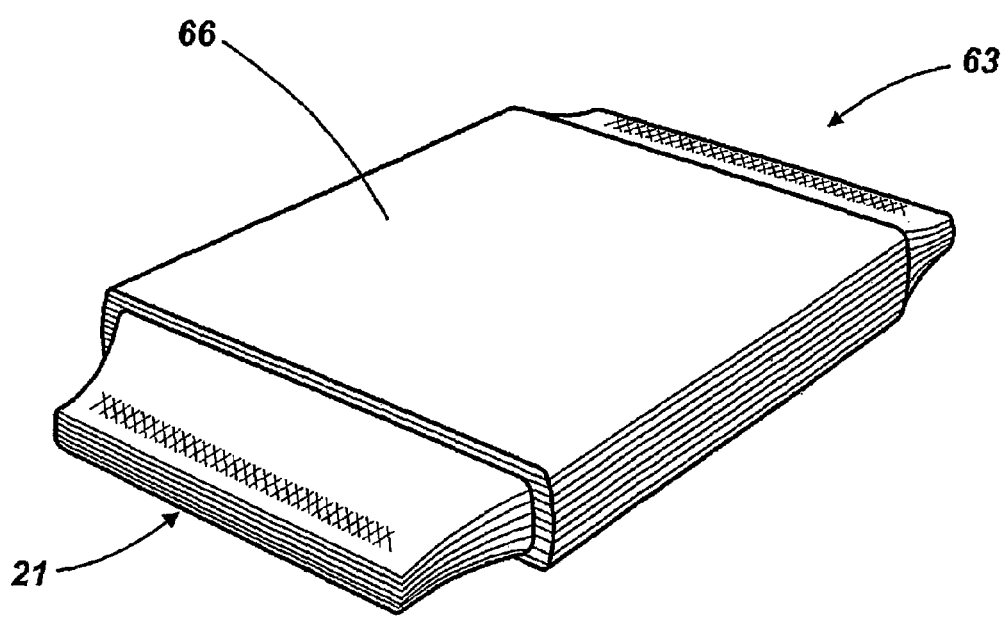
FIG. 13 is a perspective view of a cut and stacked combination of sheets.

Once the stack is formed, all of tabs 21 are abutted and ultrasonically welded together and all of tabs 63 are abutted and ultrasonically welded together. An example of a stack is schematically illustrated in FIG. 13.

Figure 12:
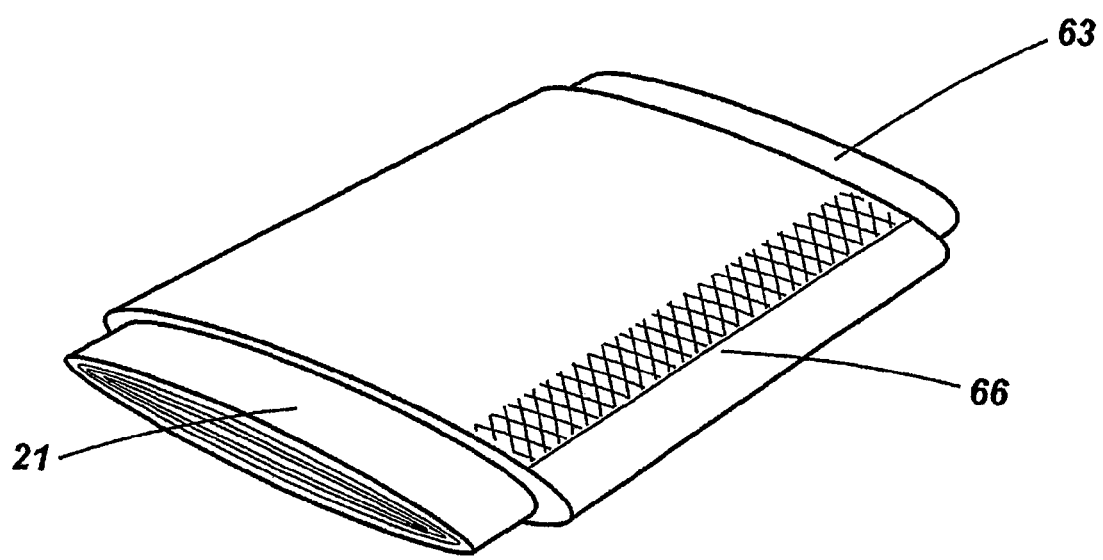
FIG. 12 is a perspective view of a rolled combination of sheets.

In an alternative embodiment, the layered combination of sheets that leaves station 56 is not cut but, rather, rolled in a flat stack that has an initial width which is the distance between adjacent slots 22. Once rolled, the sheets take the form illustrated in FIG. 12. That is, the rolling occurs along a transverse axis and tabs 21 and 63 protrude from opposite transverse ends of the roll. The sheets are retained in the rolled configuration by the application of an ultrasonic weld 66 to the roll. While this embodiment is concerned with the rolling of four coated aluminium sheets, in other embodiments more sheets, and the required separator sheets, are used.

An alternative approach is to spiral wind the layers and then flatten them.

In further embodiments the layered combination of sheets that leaves station 56 is not cut but, rather, folded in a z-stack with the folds being made along transverse fold lines that extend through the slots. That is to say, that the sheets are concertinaed. Again, use is made of an ultrasonic weld or other retention means for retaining the stack in a flattened configuration.

Figure 9:
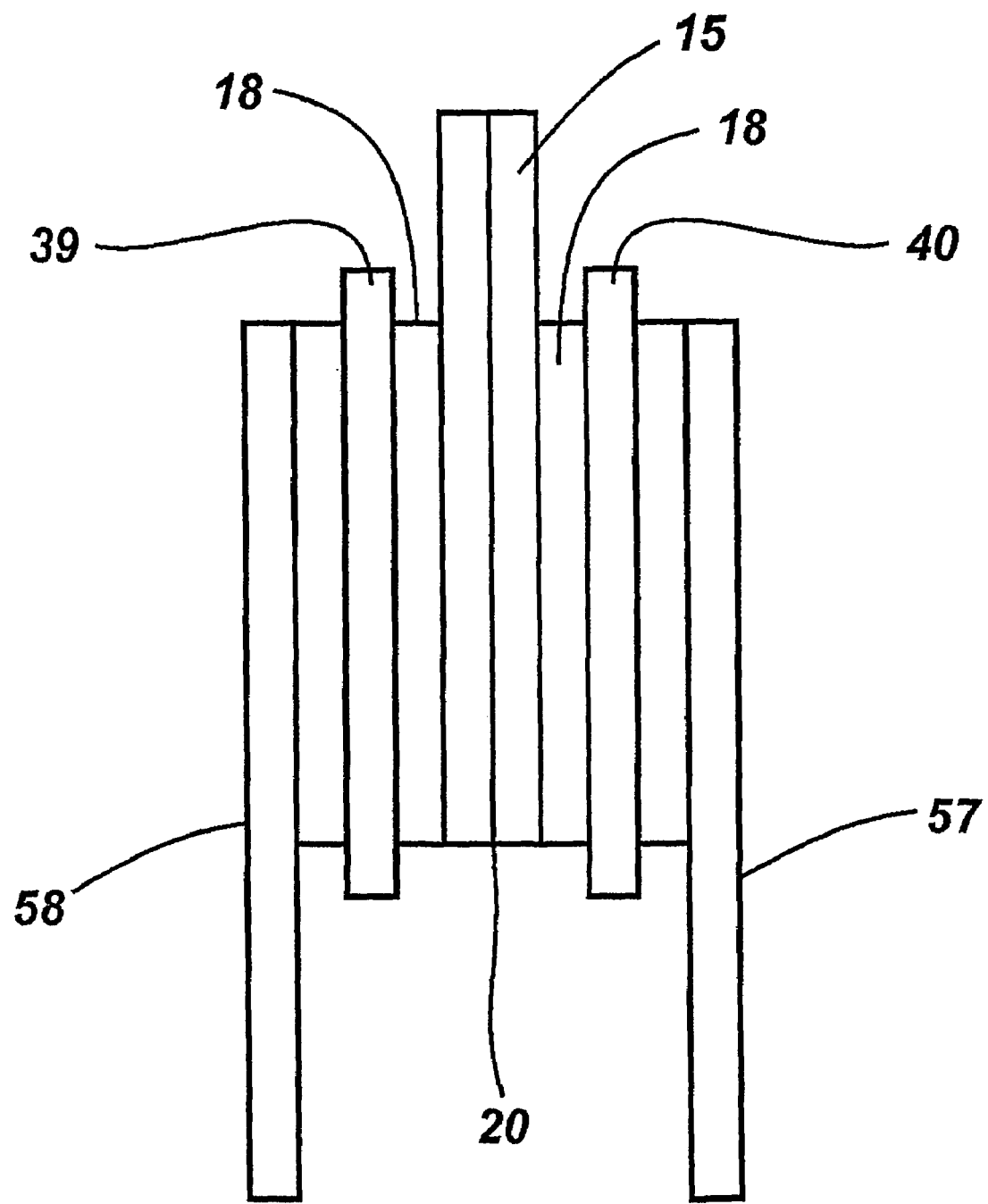
FIG. 9 is a cross section similar to that of FIG. 8 illustrating an alternative embodiment of the invention.

The above embodiments have only described the use of many separate aluminium sheets that are combined. However, in other preferred embodiments use is made of different combinations. For example, FIG. 9 is a cross sectional view similar to that of FIG. 8 where corresponding features are denoted by corresponding reference numerals. In this embodiment, rather than using two back-to-back sheets 15, use is made of a single folded sheet 15. This folded sheet includes two separate carbon strips, one each side of the fold. However, in other embodiments, the sheet includes a single carbon strip that is centrally folded upon folding of the sheet as a whole.

Figure 10:
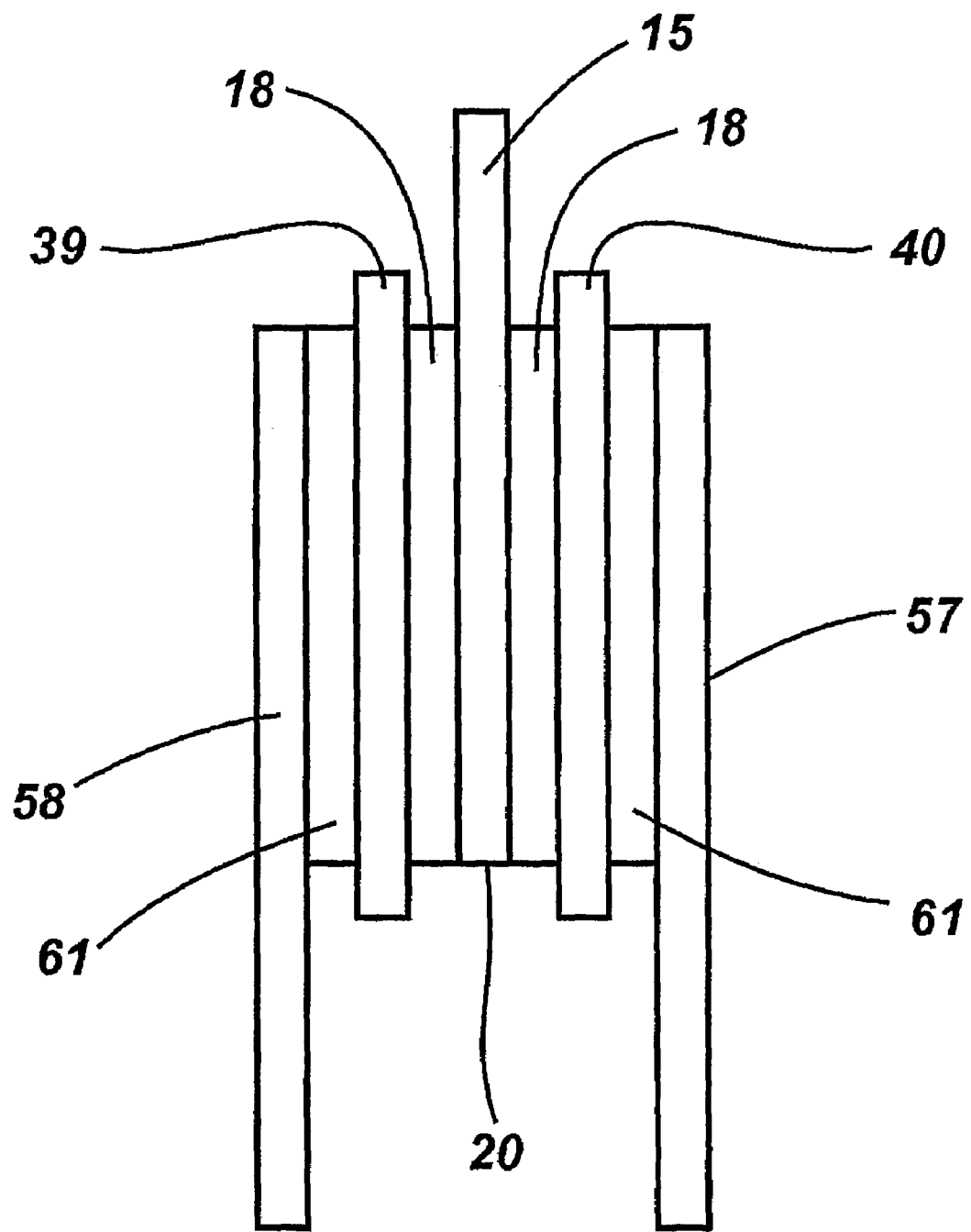
FIG. 10 is a cross section similar to that of FIG. 8 illustrating a further embodiment of the invention.
Figure 11:
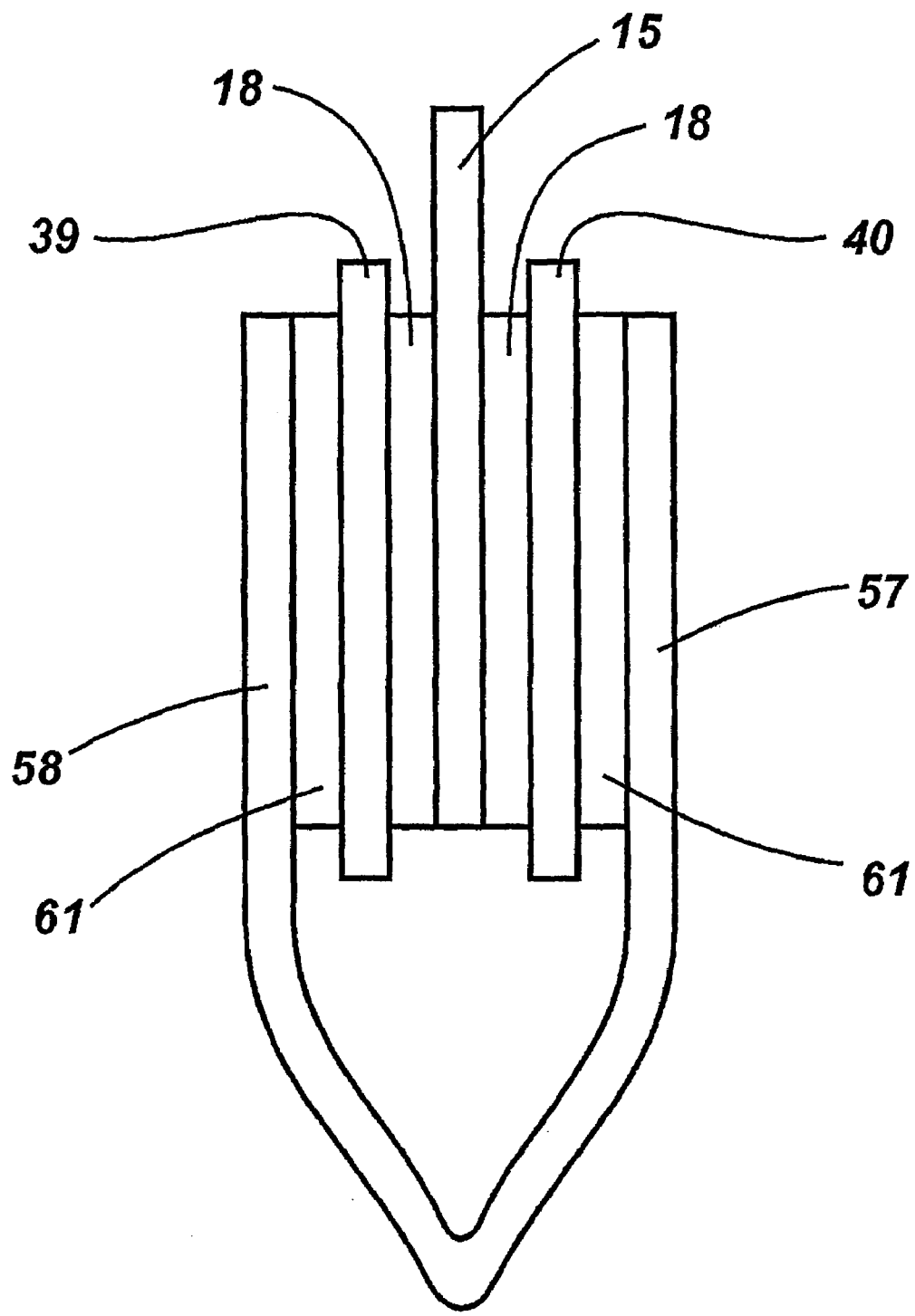
FIG. 11 is a cross section similar to that of FIG. 8 illustrating a further alternative embodiment of the invention.

Another example is provided in FIG. 10 where sheet 15 includes a carbon coating on both sides and, as such, only a single thickness of sheet 15 is required. A further example is shown in FIG. 11 where sheets 57 and 58 are integrally formed and folded about a common fold line 65.

Figure 11A:
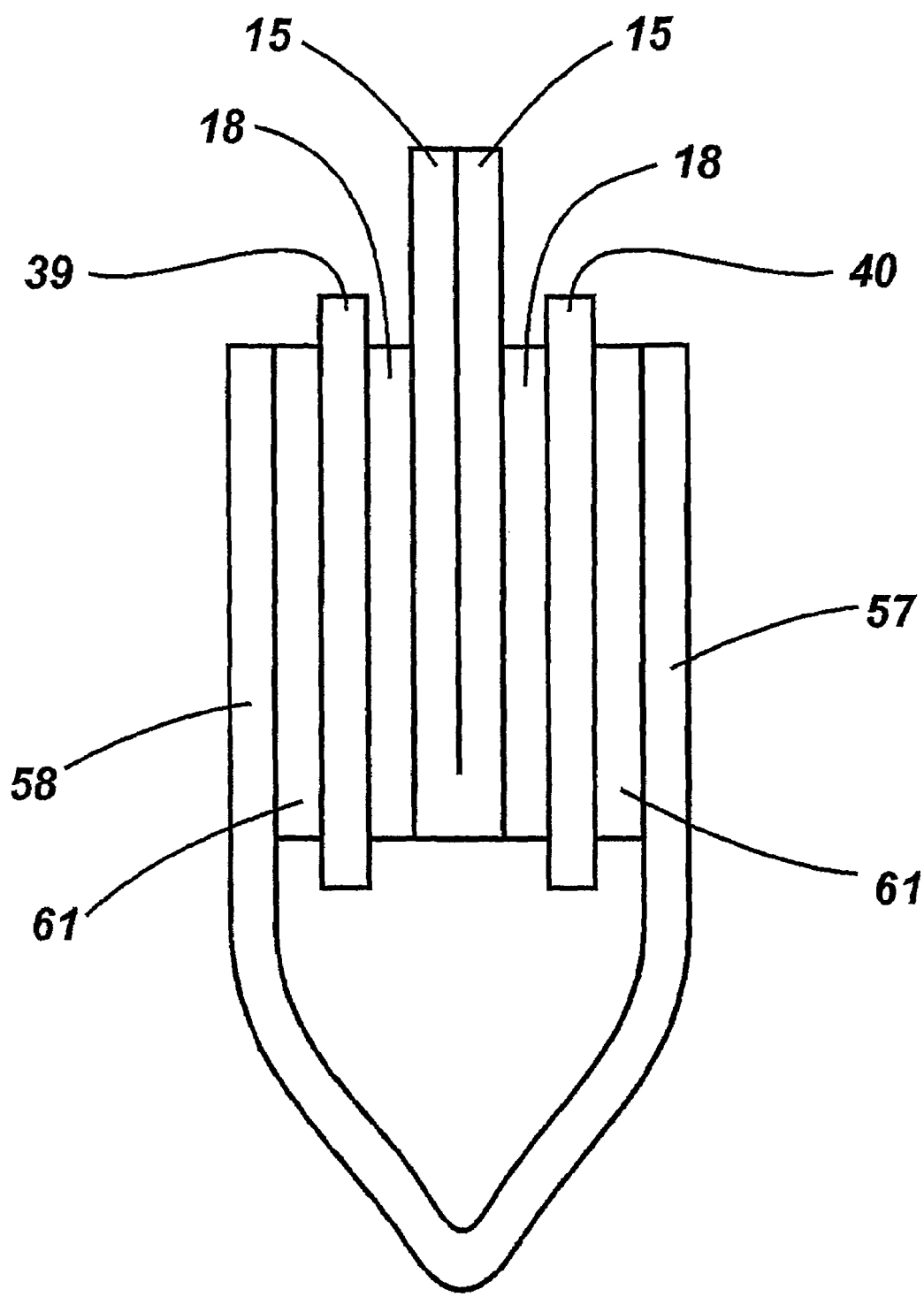
FIG. 11a is a cross section similar to that of FIG. 8 illustrating a further alternative embodiment of the invention.

A further example is illustrated in FIG. 11a where use is made of two folded electrodes.

Other combinations are possible as would be now understood from the teaching herein.

In all these embodiments, however, tabs 21 extend transversely from edges 47 of sheets 39 and 40, while tabs 63 extend transversely from edges 46 of sheets 39 and 40 in the opposite direction to tabs 21. The combination of sheets 15 form a first electrode of a first capacitive cell of the supercapacitor while the combination of sheets 57 and 58 form a second electrode of the first capacitive cell of the supercapacitor. Accordingly, it is important that good electrical contact is established between separate sheets 15 and good electrical contact is established between sheets 57 and 58. Conversely, it is important to ensure a high electrical resistance exists between sheets 15 and both of sheets 57 and 58. The first consideration is accommodated by the interconnection of like tabs which are overlapped at opposite transverse ends of the cell. The second consideration is accommodated by sheets 39 and 40 that extend across and beyond all the overlapping areas between sheets 15 and sheets 57 and 58.

Figure 14:
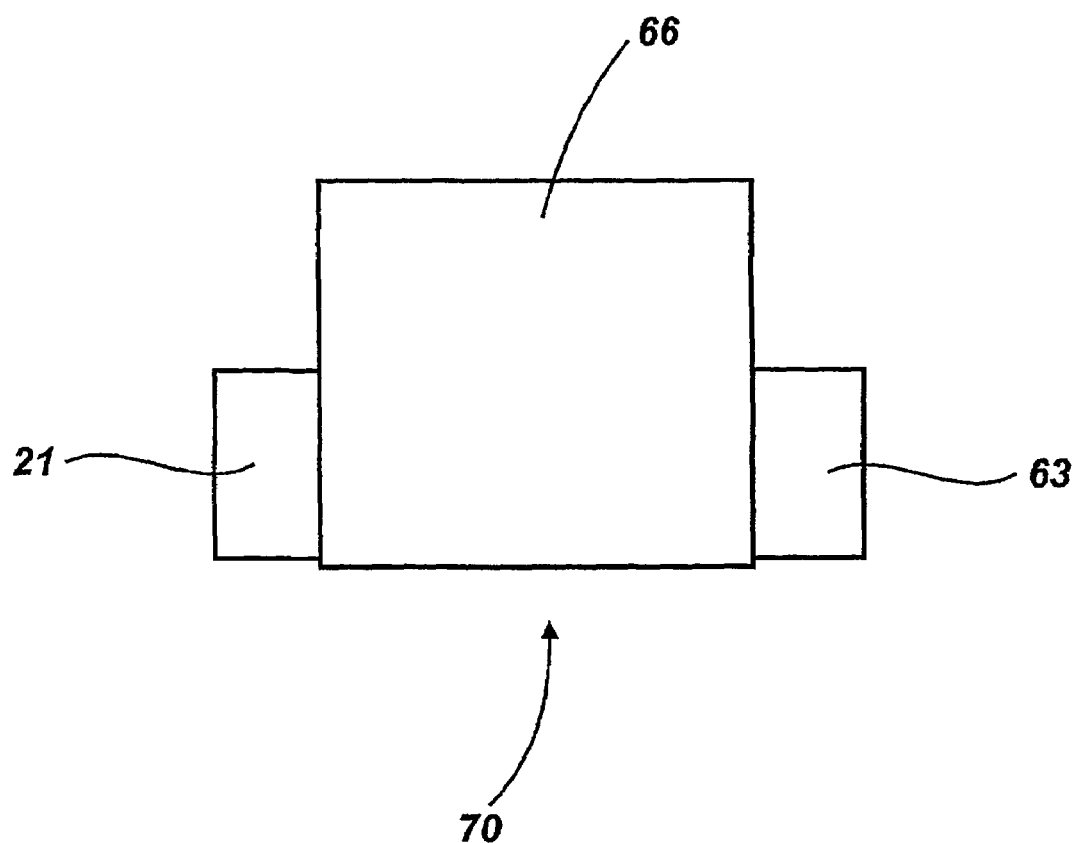
FIG. 14 is a plan view of a capacitive cell with its tabs trimmed.
Figure 14A:
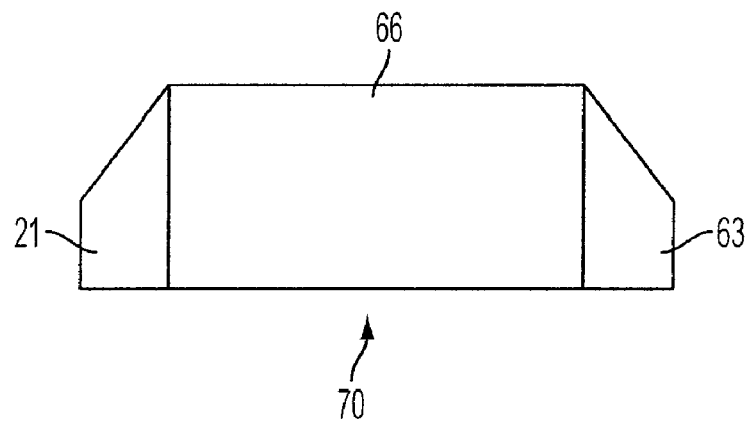
FIG. 14a is a plan view of an alternative capacitive cell with its tabs trimmed.

The next stage in the manufacturing process is to trim the tabs 21 and 63. More particularly, reference is made to FIG. 14 where a capacitive cell 70 is illustrated. This cell has had the tabs trimmed to about half their initial longitudinal extent. In other embodiments the trimming removes a different amount of the tabs. For example, in the embodiment illustrated in FIG. 14a one end of each tab is trimmed at an acute angle. This is done to better improve the packing density of the overall supercapacitor. That is, such a supercapacitor uses a number of the cells in a folded configuration and, depending upon the nature of the folding used, there is advantage to be gained by judicious trimming at this stage in the process. This effect will be discussed further below.

Figure 14B:
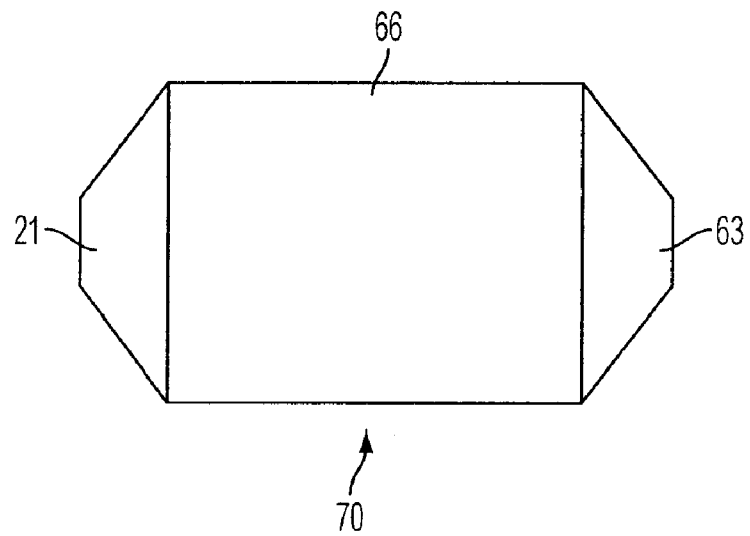
FIG. 14b is a plan view of a further alternative capacitive cell with its tabs trimmed.

In another example illustrated in FIG. 14b, the tabs are trimmed symmetrically about the centre line of the cell. More particularly, one end of both tabs are trimmed at an acute angle, while the other end of both tabs is trimmed at an obtuse angle.

While it is usual to have the tabs equally trimmed, in some embodiments this does not occur. Additionally, in this embodiment the tabs are trimmed from the centre to one end. However, in alternative embodiments, the remaining tab is central, not offset.

Figure 16:
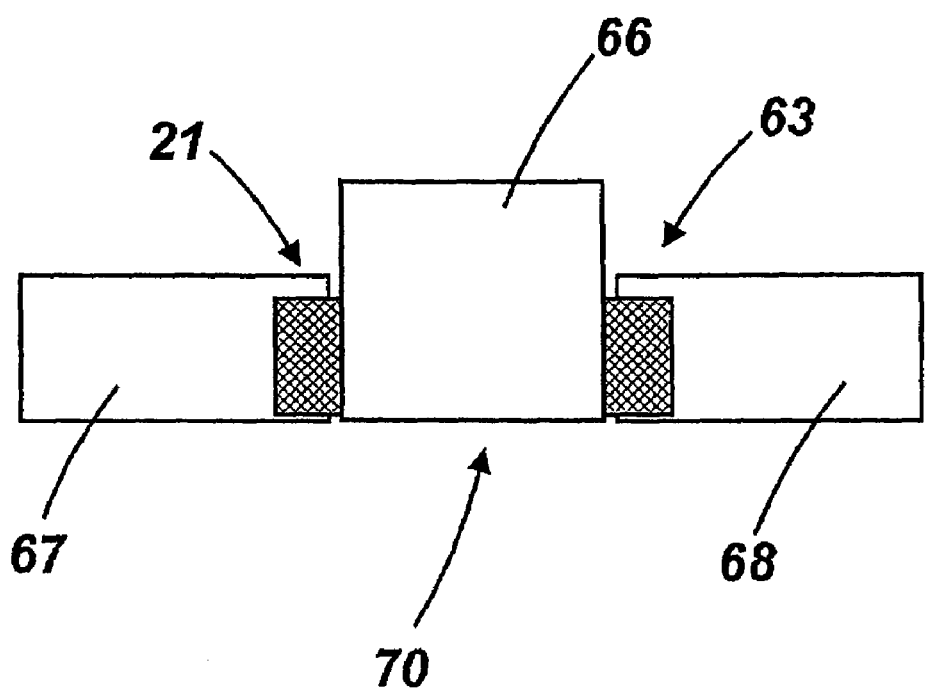
FIG. 16 is a plan view of a capacitive cell and terminals.

Tabs 21 and 63 are then attached to respective substantially planar rectangular terminals 67 and 68, as shown in FIG. 16. The terminals are made from aluminium and extend transversely outwardly from the respective tabs and away from each other. The attachment in this embodiment is by way of ultrasonic welding, although in other embodiments use is made of conductive adhesives, soldering, or other like means.

Terminals 67 and 68 have dimensions of about 10×8×0.15 mm. In other embodiments different thickness are used depending upon the current carrying capacity for which the supercapacitor is designed. For the more usual supercapacitors, the thickness of the terminals is in the range of about 100 microns to about 300 microns.

Figure 15:
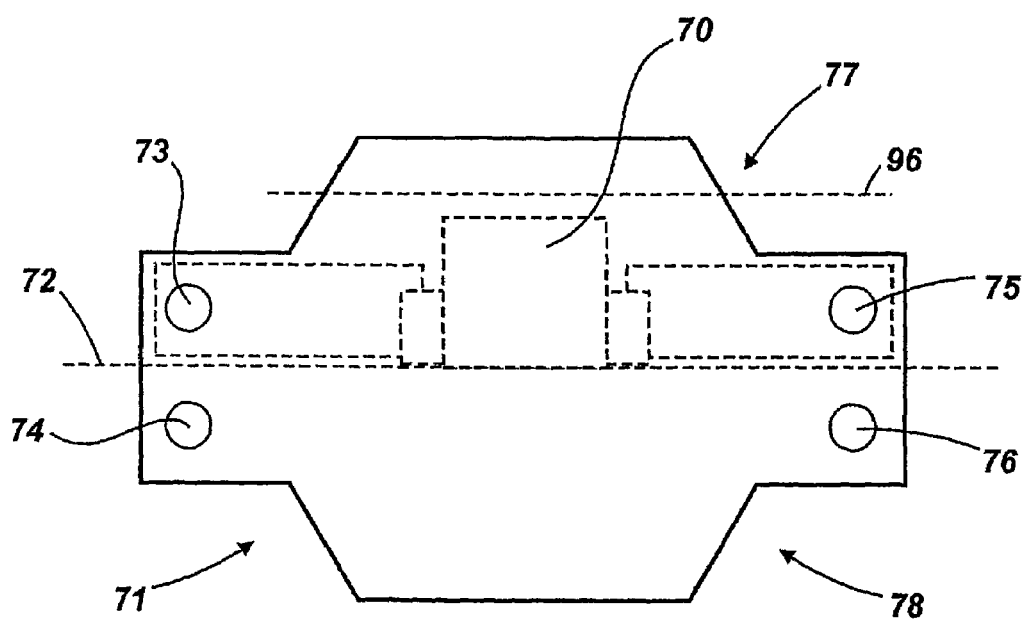
FIG. 15 is a plan view of the capacitive cell of FIG. 14 lying on the sheet that is to be formed into a housing.

As best shown in FIG. 15, cell 70, which is illustrated in ghosted outline, is intended to be placed on a flexible laminate sheet 71. The sheet is symmetrical about fold line 72 and includes four spaced apart circular openings 73, 74, 75 and 76 that extend through the sheet. For convenience, the portions of sheet 71 that lie above and below line 72 will be referred to as portion 77 and portion 78 respectively.

Figure 15A:
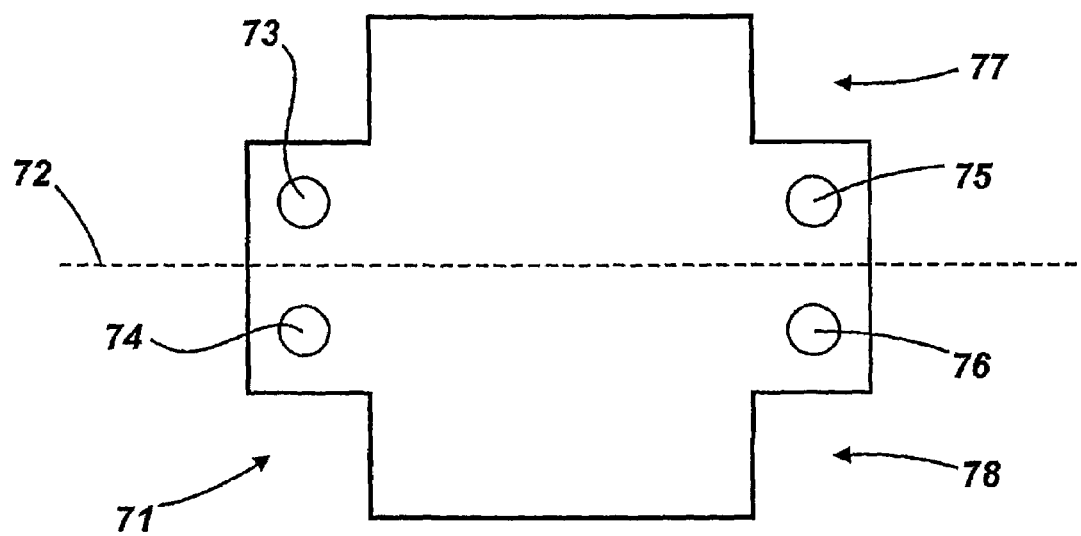
FIG. 15a is an underside view of the housing of FIG. 15.
Figure 15:
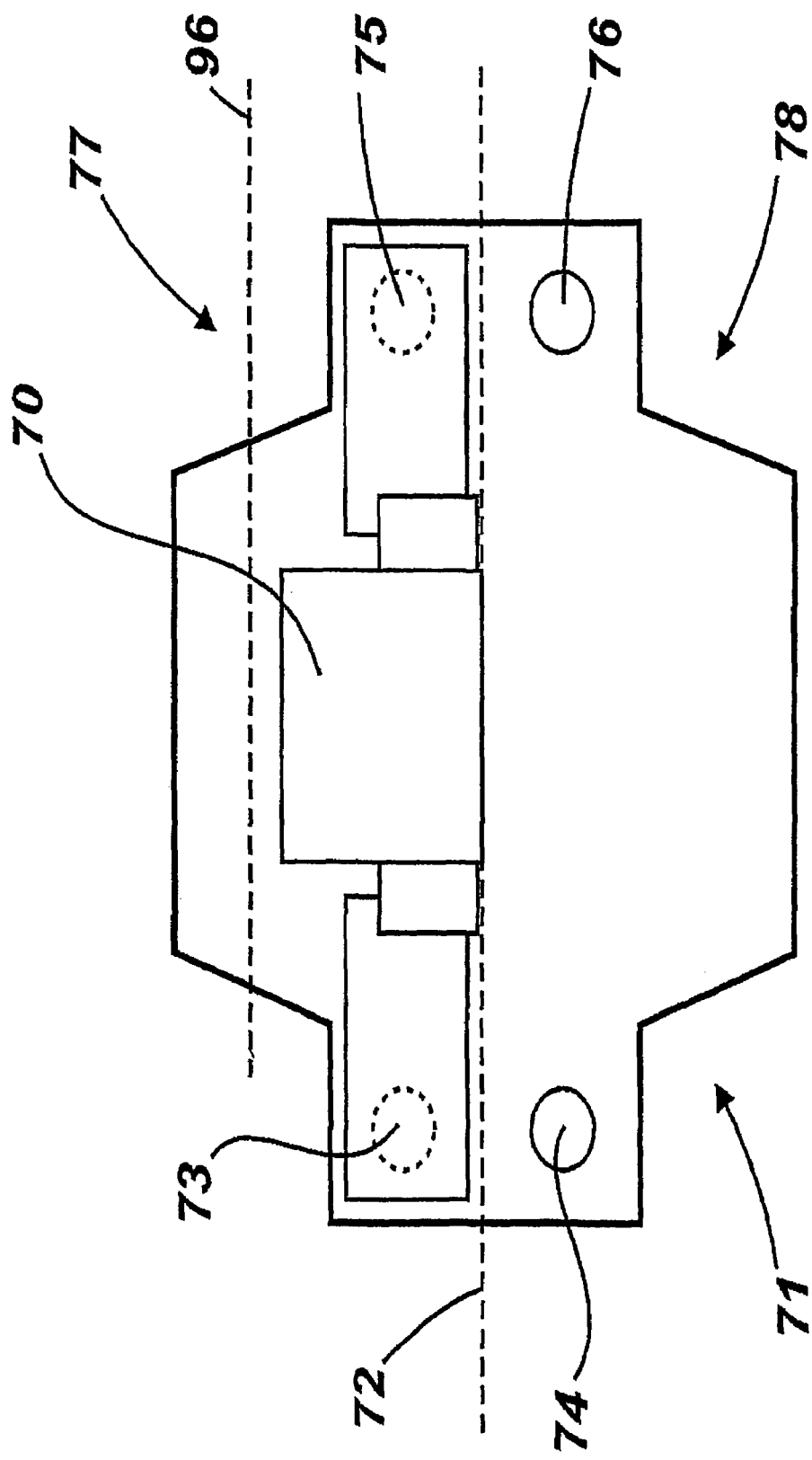

Based upon the teaching herein it will be appreciated by those skilled in the art that sheet 71 need not be the shape shown in FIG. 15. For example, two alternative sheets 71 are illustrated in FIGS. 15a and 15b respectively.

In the FIG. 15 embodiment, openings 73, 74, 75 and 76 are 4 mm in diameter. In other embodiments alternative diameters are used. In further embodiments the openings are other than circular. For example, some embodiments make use of generally square openings, in that the openings include four straight sides that are joined by rounded corners.

As will become clear from the following description, the terminals are to be sealingly engaged with sheet 71 at least about the periphery of openings 73, 74, 75 and 76. Accordingly, in some embodiments, both side of terminals 67 and 68 are coated with an adhesive or sealant to facilitate the required engagement. However, in other embodiments neither of these additional substances is required due to the properties of sheet 71.

Sheet 71 includes an internal aluminium layer to provide high barrier properties to the ingress and egress of fluids through and sheet. Moreover, the sheet includes at least one outer layer that is thermoformable into sealing engagement with itself and terminals 67 and 68. An example of a preferred sheet 71 is disclosed in Australian provisional patent application no. PQ8700 filed on 10 Jul. 2000, the disclosure of which is incorporated herein by way of cross reference. However, other laminate sheets are also suitable.

Figure 17:
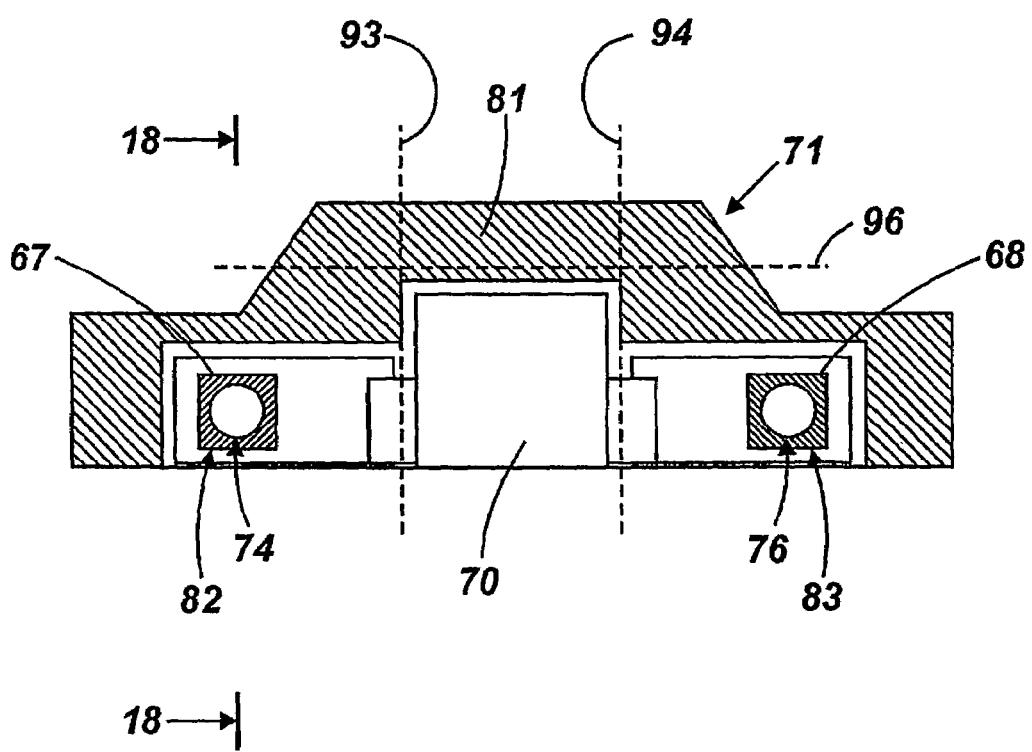
FIG. 17 is a plan view of the cell of FIG. 14 in a folded enclosure.

Cell 70 is placed on sheet 71 such that it lies only on portion 77 and with terminals 67 and 68 covering completely respective openings 73 and 75. Portion 78 is then folded along line 72 back over cell 70 and portion 77. The resultant configuration is illustrated in FIG. 17. This figure also includes cross-hatching to indicate the three areas 81, 82 and 83 of the folded sheet 71 to which pressure and heat are subsequently applied to seal cell 70 within sheet 71.

The heat applied to area 81 is sufficient in intensity and duration to cause the portions 77 and 78 to be thermoformed into sealing engagement with each other along all of their abutting peripheries. As terminals 67 and 68 do not extend outwardly from between the abutted peripheries of portions 77 and 78, those abutted peripheries lying in area 81 provide, in combination, a laminate of substantially uniform thickness. This facilitates the application of the heat and pressure to area 81 and improves the sealing between portions 7 and 78. That is, the uniform thickness reduces the risk of uneven thermal loading across area 81 and, hence, allows more precise control of the heating and sealing process. This, in turn, further enhances the applicability of the present manufacturing method to automation.

Preferably, cell 70 is wetted thoroughly with electrolyte prior to placement on sheet 71. In other embodiments, however, the heat sealing is a two step operation and the electrolyte is deposited into the housing formed by sheet 71 between those two steps.

It will be understood by the skilled address that the electrolyte allows for ionic conduction between the electrodes in the cell and that a variety of electrolytes are available.

The heat that is applied to sheet 71 is also sufficient to affect sealing engagement between sheet 71 and terminals 67 and 68 in areas 82 and 83. While not shown, it will be appreciated that portion 77 of sheet 71 is also thermoformed into sealing engagement with the adjacent surfaces of terminals 67 and 68. That is, areas 82 and 83 are replicated on the rear of the terminals.

As the planar area of terminals 67 and 68 is large in relative to the area of openings 73, 74, 75 and 76 there is considerable tolerance within the process to misalignment of cell 70 on sheet 71.

Area 82 and 83 provide respective substantially planar sites of uniform thickness. Accordingly, as with the uniformly thick area 81, similar advantages apply to the heating and sealing operation.

Figure 18:
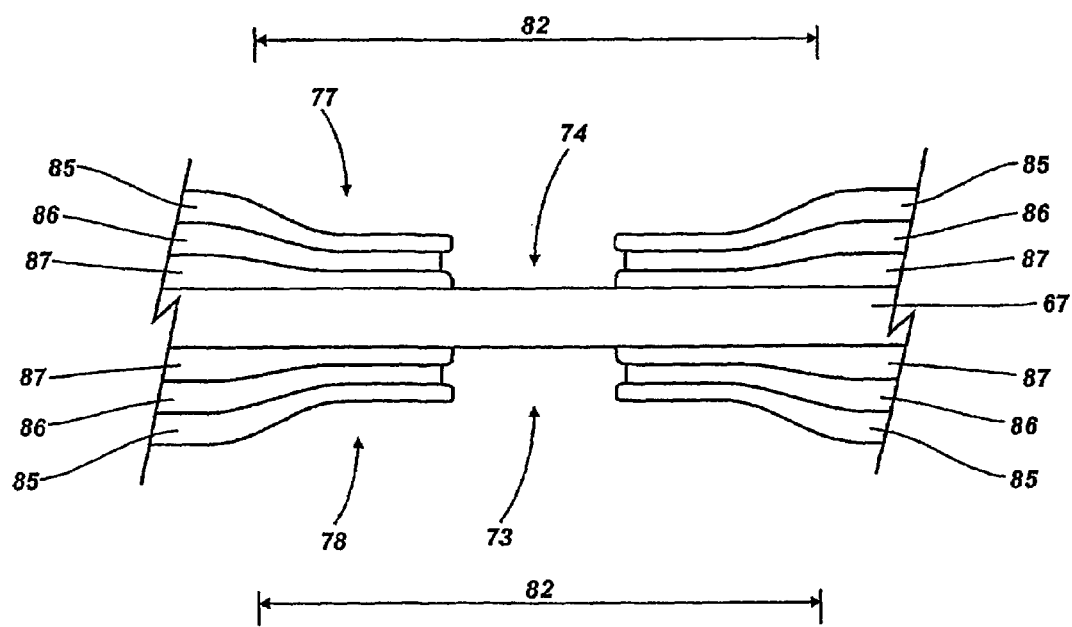
FIG. 18 is a sectional view taken along line 18—18 of FIG. 17.

In this embodiment, and as shown in FIG. 18, sheet 71 includes an outer layer 85 of PET, an intermediate aluminium layer 86 and an inner layer 87 of polyethylene. Upon the application of heat to areas 82 and 83, layer 87 softens preferentially to the other layers and bonds to the adjacent terminal. It is emphasised that this Figure, like the others, is not to scale and that the proportions have been exaggerated to more clearly illustrate the features of the preferred embodiment.

The heat sealing of sheet 71 to the terminals will be described with reference to FIG. 18. That is, two opposed heated plates (not shown) are progressed into engagement with the opposite areas 82. The plates apply both heat and compressive force to the material that is sandwiched between the plates. The heat softens layers 85 and 87, with the latter being more affected due to its lower melting point. This softening, in combination with the compressive force, results in sheet 71 being flattened in area 82.

After the heat source is removed from all areas, and the resultant structure allowed to cool, sheet 71 provides a sealed housing 88 for cell 70 and the electrolyte. It is important to note, however, that both planar sides of both terminals 67 and 68 are accessible due to openings 73, 74, 75 and 76.

Figure 19:
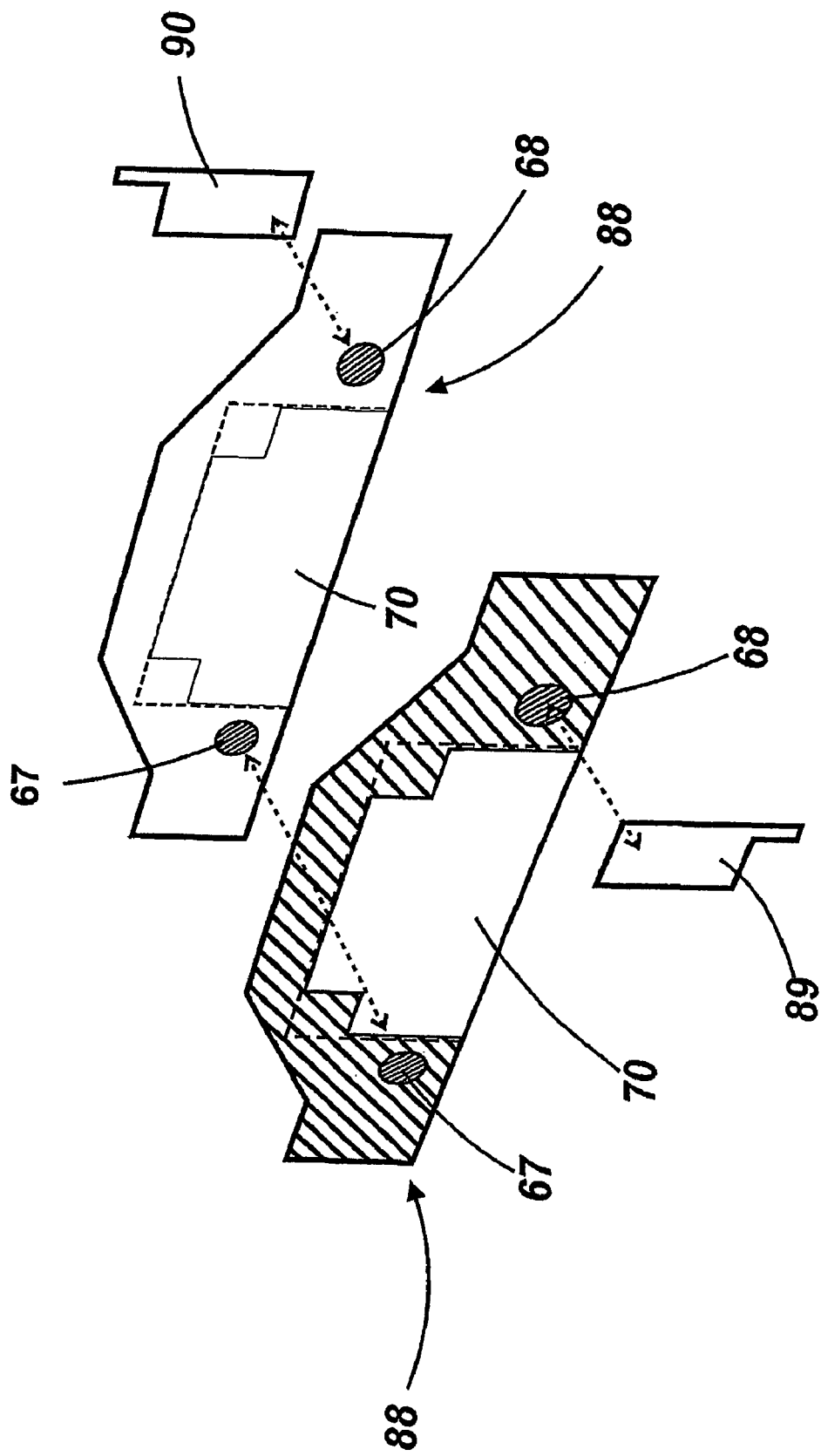
FIG. 19 is a perspective view of two cells being arranged for connection together.

As illustrated in FIG. 19, two like cells 70 are contained within respective housings 88 and are stacked together and attached to each other. That is, terminal 67 of one cell is ultrasonically welded to terminal 67 of the other of the cells. This welding is possible as access to both sides of the terminals is provided. That is, one contact of the welder is engaged with the outer face of terminal 67 of one of the cells, while the other contact of the welder is engaged with the outer face of the terminal 67 of the other of the cells. The contacts are then biased toward each other to abut the opposed faces of the terminals 67. The welder is then actuated to weld the abutted terminals together.

The two free terminals 68 provide a site for attachment of respective aluminium contact 89 and 90. Both contacts are ultrasonically welded to the respective terminals. Again, this operation is possible as access to both sides of the terminal is provided. As shown in FIG. 19, the contacts are attached opposite to each other in that they are on the outermost surfaces of the terminals. Additionally, the contacts extend away from the terminals and each other to minimise any risk of inadvertent electrical contact with each other.

Figure 20:
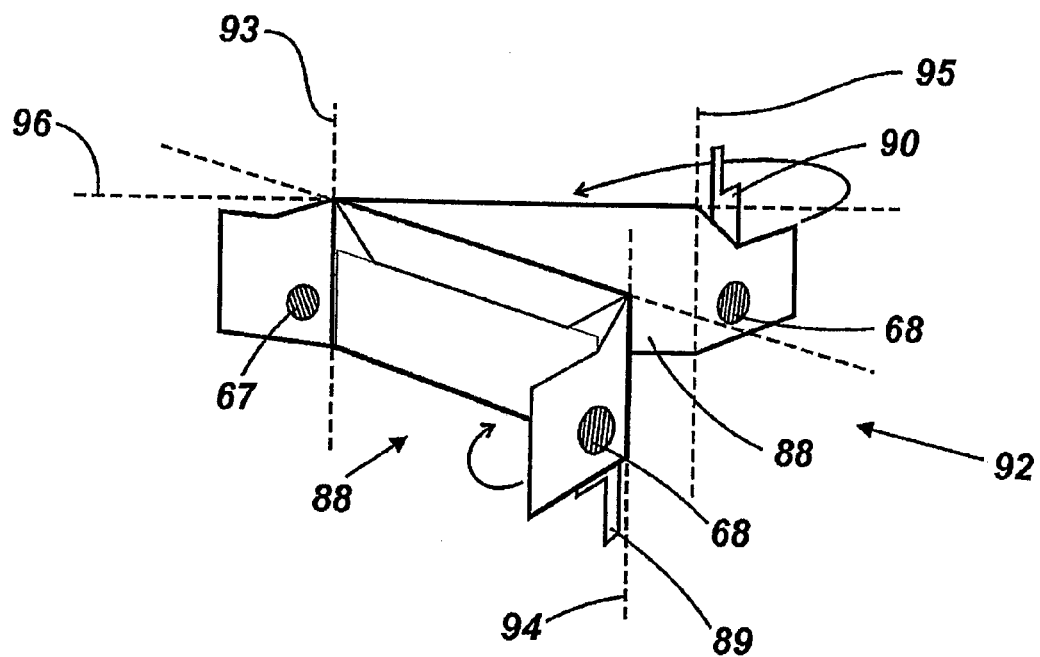
FIG. 20 is a perspective view of the cell of FIG. 19 in a partially folded configuration.

Once the welding has been completed, housings 88 are connected to form a package 92, as best shown in FIG. 20. This package is folded initially about parallel spaced apart fold lines 93, 94 and 95, the first two of which are also shown in FIG. 17. The fold lines all pass through tabs 21 or 63, but do not pass through the thicker terminals 67 and 68. In other embodiments, however, the fold does pass through terminals 67 and 68.

Figure 21:
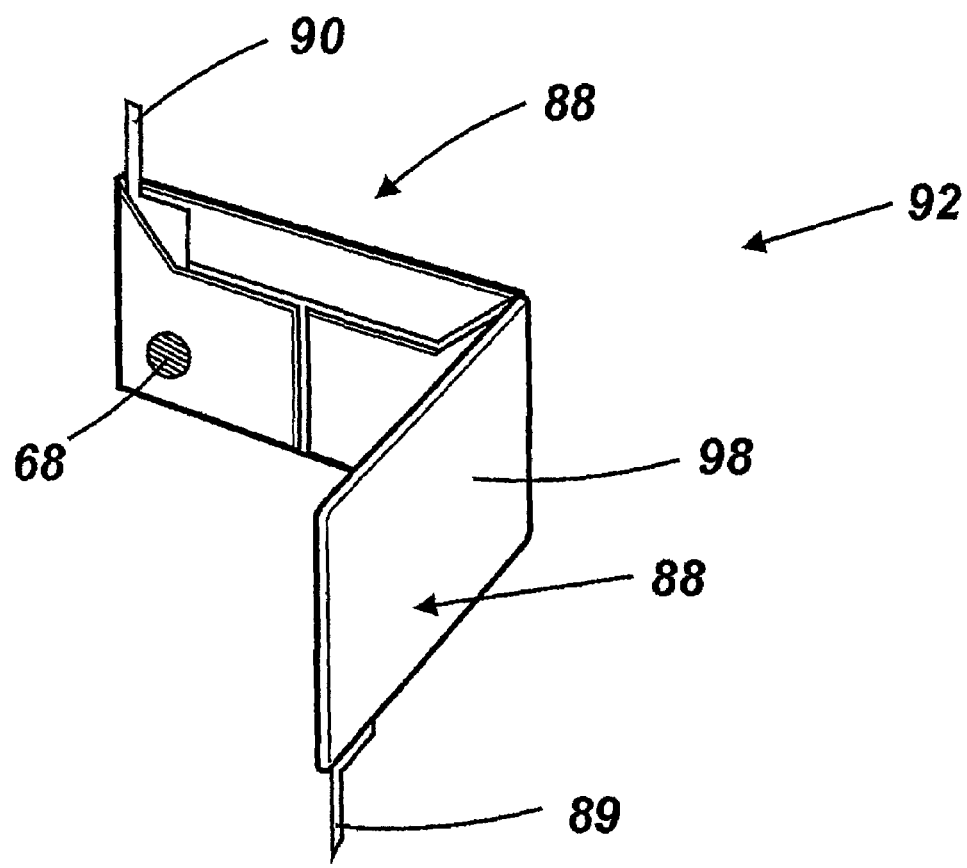
FIG. 21 is a perspective view of the cell of FIG. 20 being further folded.
Figure 22:
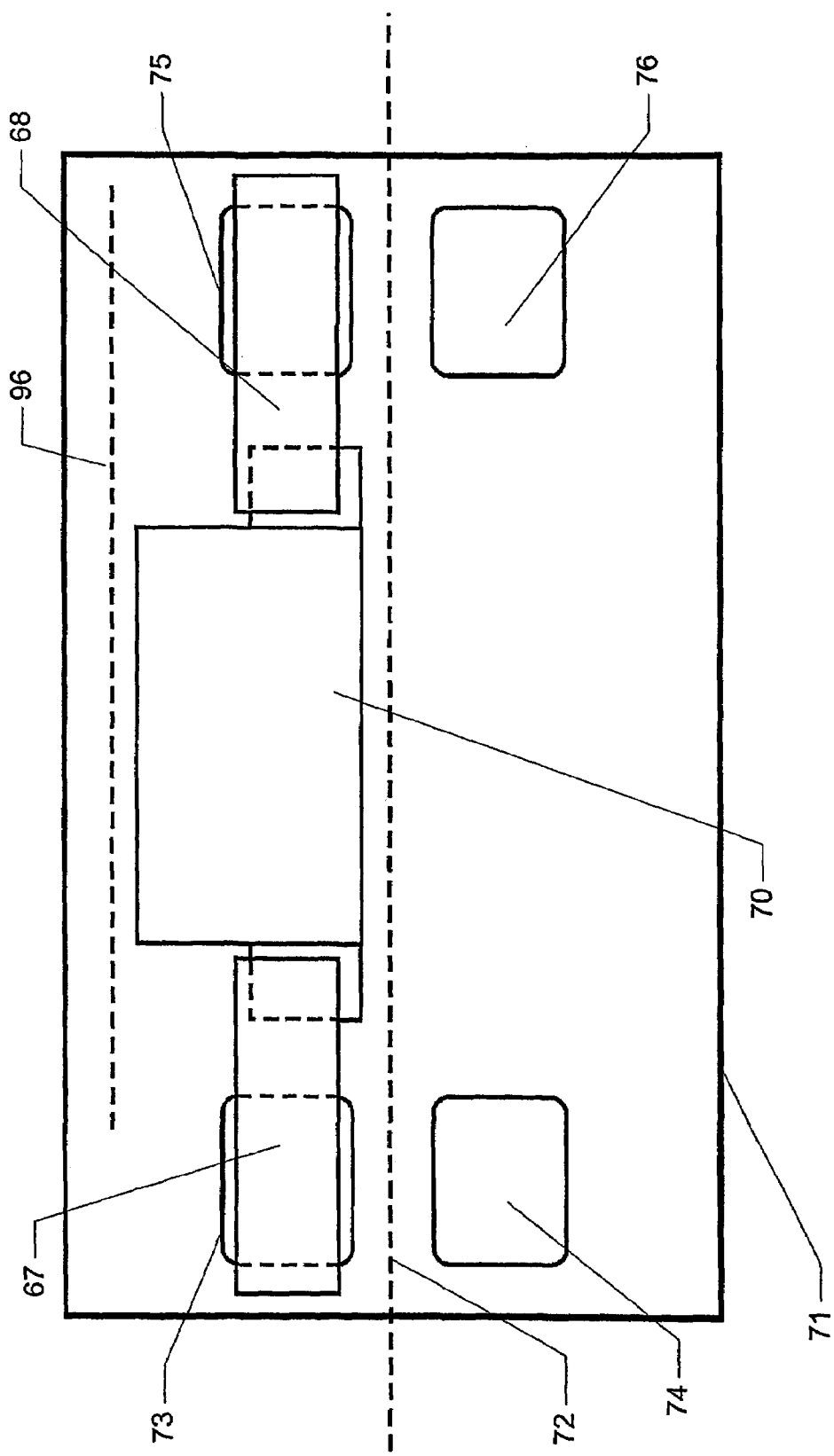
FIG. 22 is view similar to that of FIG. 15 of an alternative embodiment of the invention.

As shown in FIG. 21, the folding is such that the terminals 67 and 68 are folded back onto the cell. Moreover, in this embodiment the portions that are folded back across the cell do not overlap with each other and therefore keep the thickness of the package as a whole to a minimum.

In other embodiments, area 81 of sheet 71 is greater to provide a greater minimum seal path for the device. This is required for some combinations of:

1. Performance specification—such as raised operational temperatures;
2. Type of sheet 71; and
3. Type of electrolyte.

In such embodiments there is some overlap between the portions that are folded back over the cell. However, there is no overlap of terminals 67 and 68.

Package 92 is also folded along fold lines 96. The folded portions overlap with the cell and are folded onto the same side of the cell as the other folded portions. In this embodiment all the folded portions do not overlap each other, although in other embodiments this does occur.

It will be appreciated that it is not critical if the fold along lines 96 causes some overlap, as this portion is relatively thin, being only two layers of sheet 71. The thickest folded components are terminals 67 and 68 and, as such, from a packing density point of view, these are the more important determinants of the overall thickness of the supercapacitor.

Reference is now made to FIG. 21 which shows package 92 as it is further folded. As illustrated, all the folded portions are folded inwardly and across the cell to provide smooth continuous outer faces 98. That is, all the folded portions are contained and captured between the separate housings 88 and are not exposed. Accordingly, the risk of the folded portions returning to their original unfolded configurations is minimised. It also provides a substantially clean and planar exterior surface to minimise the risk of the housing catching or fouling with other objects inadvertently during the automated manufacturing process.

In this folded configuration contacts 89 and 90 extend outwardly from package 92. These are subsequently deformed to extend back along their respective lengths and toward each other. An additional deformation is then applied such that the contacts extend outwardly from between the folded housing 88, as best shown in FIG. 1.

A skilled addressee will note from FIG. 21 that the two terminals 68 have exposed faces that are closely adjacent in the folded package. In some embodiments these exposed faces are coated with an electrically insulating material to prevent any inadvertent contact of the terminals. An example of such a material is an epoxy resin.

All the heat welds that are performed to package 92 are to planar surfaces. That is, areas 81, 82 and 83 are substantially planar across their entirety. Accordingly, the heat seal is not compromised by contour variations as is suffered by prior art products. Moreover, the area of the seal is large and therefore less sensitive to manufacturing tolerances.

The embodiment described above and as illustrated in the drawings, the two like cells 88 are connected in series. In other embodiments supercapacitor 1 include more than two cells in series. In further embodiments cells 88 are connected in parallel. Moreover, some embodiments include a hybrid series/parallel combination.

Package 92, in the folded configuration, is received within frame 3 and captively retained in that configuration. In the present embodiment, tabs 13, 14, 15 and 16 of frame 3 are movable between an open configuration and a closed configuration (as shown in FIG. 1) in which the package is respectively allowed and prevented from movement through the opening. The tabs are integrally formed with the frame and are deformed into the open and the closed configurations. As frame 3 is formed from tinned metal, the deformation of tabs 13, 14, 15 and 16 is reversible. In other embodiments, however, the tabs are only deformable once. That is, the tabs are originally in the open configuration and are deformed once only into the closed configuration when package 92 is received within the frame.

As tabs 13, 14, 15 and 16 are deformed into engagement with the thinner portion of the folded cells, it does not unnecessarily contribute to the overall dimensions of the supercapacitor.

Frame 3 not only applies a compressive force to housing 2 to retain it in the folded configuration, but also takes the mechanical load from contacts 4 and 5.

Reference is now made to the embodiment of the invention illustrated in FIGS. 22 to 25 where corresponding features are denoted by corresponding reference numbers. For the sake of clarity, not all reference numerals have been reproduced.

Figure 23:
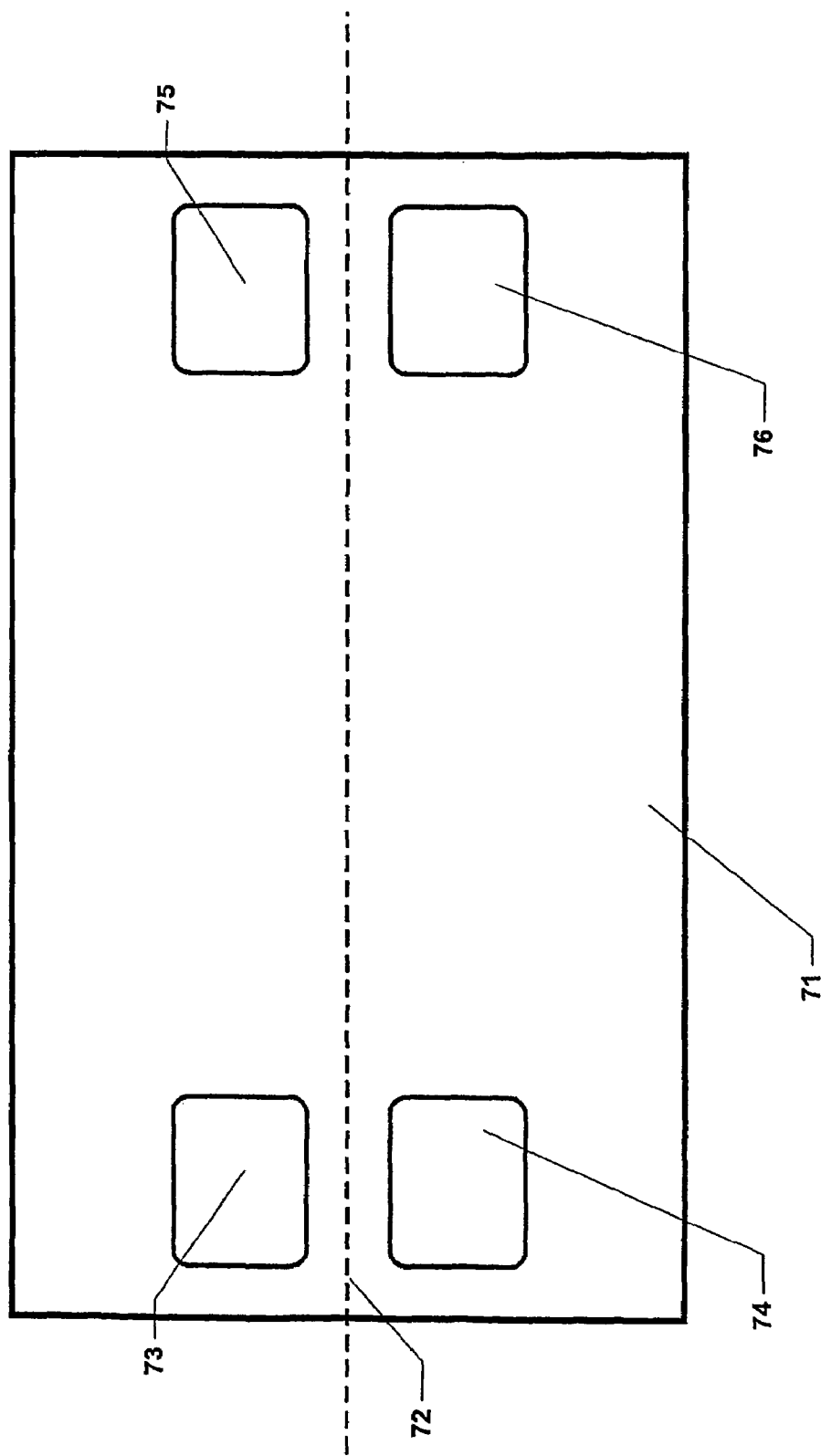
FIG. 23 is a view similar to that of FIG. 15a for the embodiment of FIG. 22.

As best shown in FIG. 23, openings 73, 74, 75 and 76, while being symmetrically disposed about fold line 72, are generally square as opposed to the round openings of the other embodiment. Additionally, tabs 67 and 68 extend across the openings but, unlike the corresponding tabs in the earlier embodiment, they do not completely cover those openings.

Figure 24:
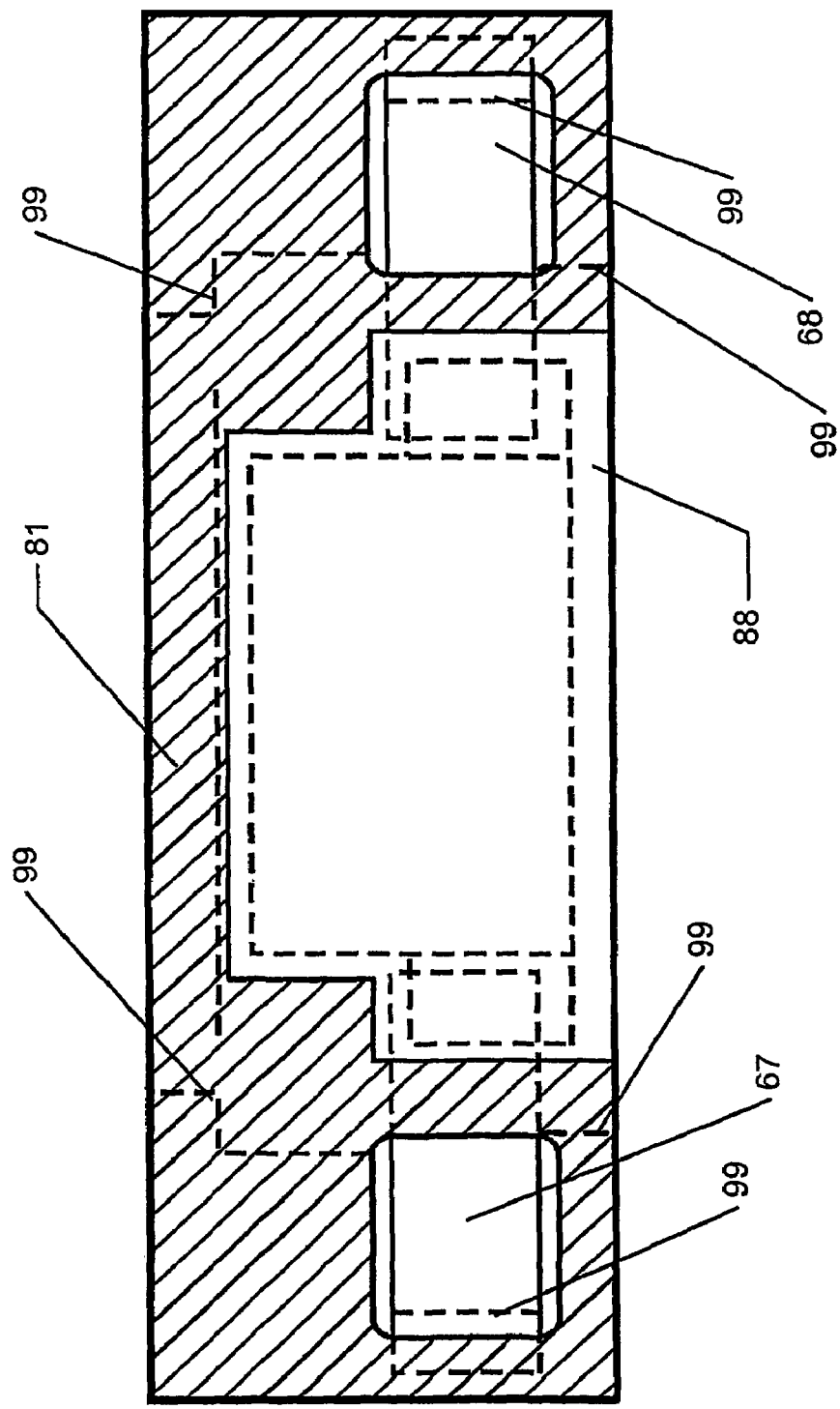
FIG. 24 is a view similar to that of FIG. 17 for the embodiment of FIG. 22.

This configuration allows the heating and sealing operation to occur across a large continuous area 81, as shown in FIG. 24. That is, only a single area has heat and pressure applied to it, as opposed to the three separate areas 81, 82 and 83 of the FIG. 17 embodiment.

Additionally, once the heating and sealing has been affected, the housing 88 of FIG. 24 is cut along a trim line 99 that is shown in the Figure as a broken line. Two of the housings 88 are shown in FIG. 25.

The initial heating and sealing across a continuous region, and later trimming, provides the following advantages:

1. The greater area of sheet 71 makes it easier to handle and manoeuvre during the heating and sealing operation;
2. The cutting allows a greater amount of sheet 71 to be removed, hence increasing the packing density of the resultant device;
3. The trim line 99 does not pass through any region where sheet 71 overlies terminals 67 and 68. One contributing factor to this is that the terminals do not cover the respective openings. Accordingly, the risk of shorting those terminals to the aluminium layer 86 during the cutting operation is minimised if not avoided.
4. As the cutting occurs after the sealing, the manufacturing is less sensitive to the initial positioning of cell 70 on sheet 71, the length of terminals 67 and 68, and the positioning of terminals 67 and 68 following their attachment to respective tabs 21 and 63.

Figure 25:
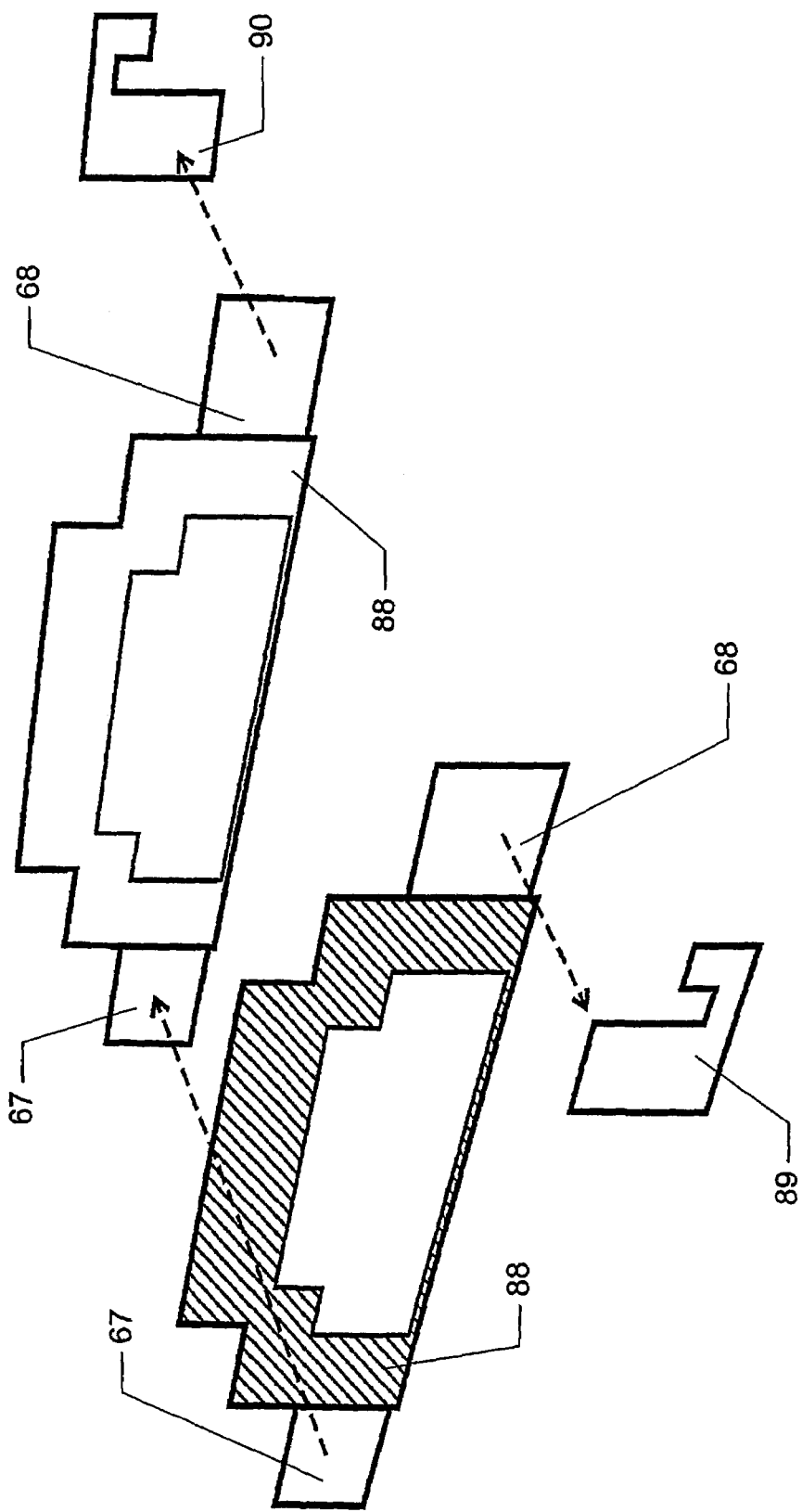
FIG. 25 is a view similar to that of FIG. 19 for the embodiment of FIG. 22.

Once the cutting only trim line 99 has occurred, as shown in FIG. 25, terminals 67 and 68 are exposed and easily accessible for attachment to another terminal, or to contacts 89 and 90, as the case may be. The two cells 88 of FIG. 25 are attached and folded similarly to the embodiment shown in FIGS. 19 to 21. The folded structure is then placed within a frame to maintain that folded configuration and to facilitate mounting of the resultant supercapacitor.

The process of producing the supercapacitor of the preferred embodiments described above is extremely well suited to mass production and repeatability of manufacture. This is because the process:

1. Allows use of continuous feeds of sheet material;
2. Is robust because the slots:
    a) Prevent undesired short circuits between the electrodes due to the cutting operation; and
    b) Allow indexing of the continuous materials. This, in turn, allows an accurate progression of these materials as the rollers and other tensioning equipment is able to be automatically calibrated;
3. Allows great variation in the parameters of the end product. That is, there is little complication involved in using more or less coated aluminium layers or layers of different thickness or composition;
4. All the heat welds are performed on planar surfaces which eliminates the variations and cavities from which prior art heat welding suffers.
5. All the heat welds are large in area to minimise the risk of leakage or subsequent contamination.

6. Provides relatively large planar terminals and small openings in the housing. As such, the electrical resistance of the terminal is low without the need to compromise the heat seal. The primary factor for selection of the terminal thickness is the desired overall thickness of the packaging, not the effectiveness of the seal.
7. Allows a wide tolerance of heat sealing temperatures when using the preferred housing material.
8. Ensures that the electrode tabs extend outwardly and away from each other which substantially reduces the risk of contact between the tabs.

This increased robustness of the preferred embodiment provides a supercapacitor that is extremely cost effective to produce as it allows the use of automated manufacturing techniques to a level beyond known processes. Moreover, it allows the use of soft packaging that is more versatile both in manufacture and use. Also, it provides long seal paths that ameliorate leakage issues that plague the prior art devices.

Although the invention has been described with reference to specific examples it will be appreciated by those skilled in the art that it may be embodied in many other forms.

What is claimed is:

1. A method for forming an energy storage device from a continuous longitudinally extending conductive sheet of a predetermined transverse width, the method including:
   defining from the sheet a plurality of sequentially linked first electrode plates;
   engaging a separator with the electrode plates, the plates each including a tab portion that extends transversely beyond the separator;
   separating the electrode plates;
   connecting the tab portions to each other to electrically connect the electrode plates;
   arranging the first electrode plates with a plurality of second electrode plates in a predetermined configuration;
   disposing the electrode plates within a housing containing an electrolyte for allowing ionic conduction between the plates; and
   connecting two terminals to the respective pluralities of electrode plates for allowing external electrical connection to those plates.

2. A method according to claim 1 wherein defining the plates includes forming a plurality of longitudinally spaced apart transverse slots in the sheet, wherein the slots have a transverse extent less than the predetermined transverse width to define a plurality of sequentially linked first electrode plates.

3. A method according to claim 2 wherein the sheet includes two opposite transverse edges that are spaced apart by the predetermined width and the method includes forming the slots such that they extend from one of the transverse edges and terminate adjacent to the other edge.

4. A method according to claim 2 wherein the step of engaging the separator with the plates includes sandwiching the plates between two opposed separator sheets.

5. A method according to claim 4 wherein the separator sheets are retained in tensioned engagement with the plates.

6. A method according to claim 4 including the further step of engaging the two opposed separator sheets with each other through the slots.

7. A method according to claim 6 including the further step of joining the two opposed separator sheets with each other through the slots.

8. A method according to claim 7 wherein the joining of the separator sheets is by way of bonding.

9. A method according to claim 8 wherein the bonding is by way of heat sealing or heat welding.

10. A method according to claim 9 wherein the heat sealing or welding extends longitudinally across substantially all the slot.

11. A method according to claim 9 wherein the heat sealing or welding extends transversely across substantially all the slot.

12. A method according to claim 9 wherein the heat scaling is affected at two or more spaced apart locations in the slot.

13. A method according to claim 12 including the step of stacking the first and the second plurality of plates with each other in a single stack.

14. A method according to claim 1 including alternately stacking the first and the second plurality of plates with each other.

15. A method according to claim 1 including the step of applying a coating to the sheet, wherein the coating includes activated carbon particles and a binder.

* * * * *